United States Patent
Tanaka

(10) Patent No.: US 10,663,699 B2
(45) Date of Patent: May 26, 2020

(54) ZOOM LENS AND IMAGING APPARATUS

(71) Applicant: FUJIFILM Corporation, Tokyo (JP)

(72) Inventor: Takuya Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 126 days.

(21) Appl. No.: 16/108,020

(22) Filed: Aug. 21, 2018

(65) Prior Publication Data

US 2019/0064489 A1    Feb. 28, 2019

(30) Foreign Application Priority Data

Aug. 24, 2017    (JP) .................... 2017-161025

(51) Int. Cl.
| | |
|---|---|
| *G02B 13/02* | (2006.01) |
| *G02B 9/60* | (2006.01) |
| *G02B 13/06* | (2006.01) |
| *G02B 15/15* | (2006.01) |
| *G02B 15/17* | (2006.01) |

(52) U.S. Cl.
CPC .............. *G02B 13/02* (2013.01); *G02B 9/60* (2013.01); *G02B 13/06* (2013.01); *G02B 15/155* (2013.01); *G02B 15/17* (2013.01)

(58) Field of Classification Search
CPC ..................................... G02B 13/02
USPC ........................................ 359/275
See application file for complete search history.

(56) References Cited

U.S. PATENT DOCUMENTS

| | | | |
|---|---|---|---|
| 2006/0285224 A1 | 12/2006 | Endo et al. | |
| 2015/0241673 A1 | 8/2015 | Nagatoshi | |
| 2015/0241674 A1* | 8/2015 | Nagatoshi .............. | G02B 15/14 |
| | | | 359/683 |
| 2016/0274340 A1 | 9/2016 | Yonezawa et al. | |
| 2017/0082838 A1 | 3/2017 | Komatsu | |

FOREIGN PATENT DOCUMENTS

| | | |
|---|---|---|
| JP | 2006-349947 A | 12/2006 |
| JP | 2010-191334 A | 9/2010 |
| JP | 2015-161695 A | 9/2015 |
| JP | 2016-173481 A | 9/2016 |
| JP | 2017-058589 A | 3/2017 |

* cited by examiner

*Primary Examiner* — James C. Jones
(74) *Attorney, Agent, or Firm* — Studebaker & Brackett PC

(57) ABSTRACT

The zoom lens consists of, in order from an object side, a first lens group having a positive power, a second lens group having a positive power, a third lens group having a negative power, a fourth lens group having a negative power, and a fifth lens group having a positive power. During zooming, the first lens group and the fifth lens group remain stationary, and the other lens groups move. The following conditional expression relating to a focal length f1 of the first lens group and a focal length f3 of the third lens group is satisfied: $-10 < f1/f3 < -3.5$.

20 Claims, 13 Drawing Sheets

EXAMPLE 1

EXAMPLE 1

EXAMPLE 2

EXAMPLE 3

EXAMPLE 4

EXAMPLE 5

EXAMPLE 6

EXAMPLE 7

FIG. 9
EXAMPLE 1
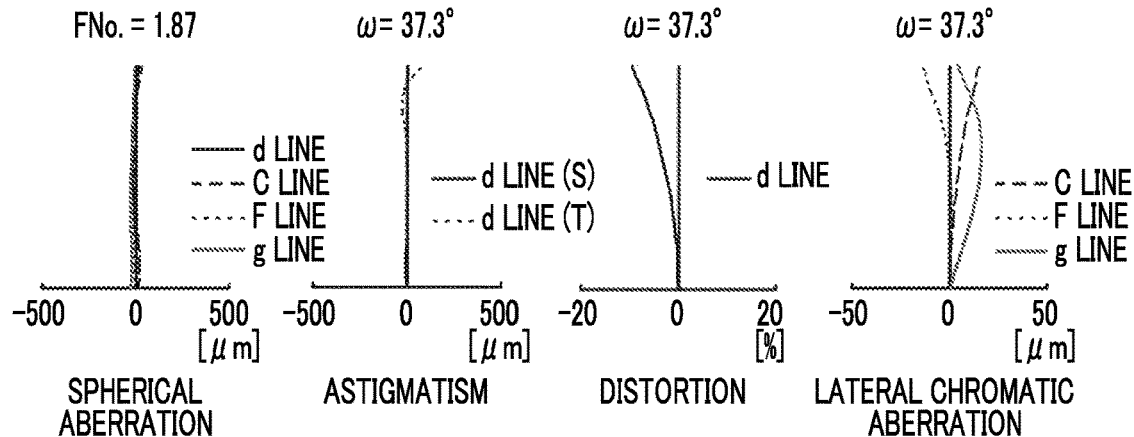
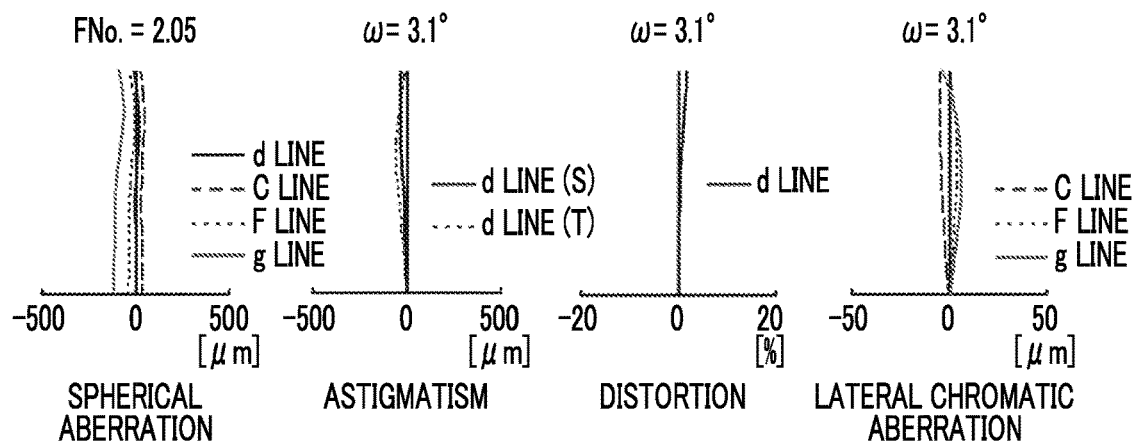
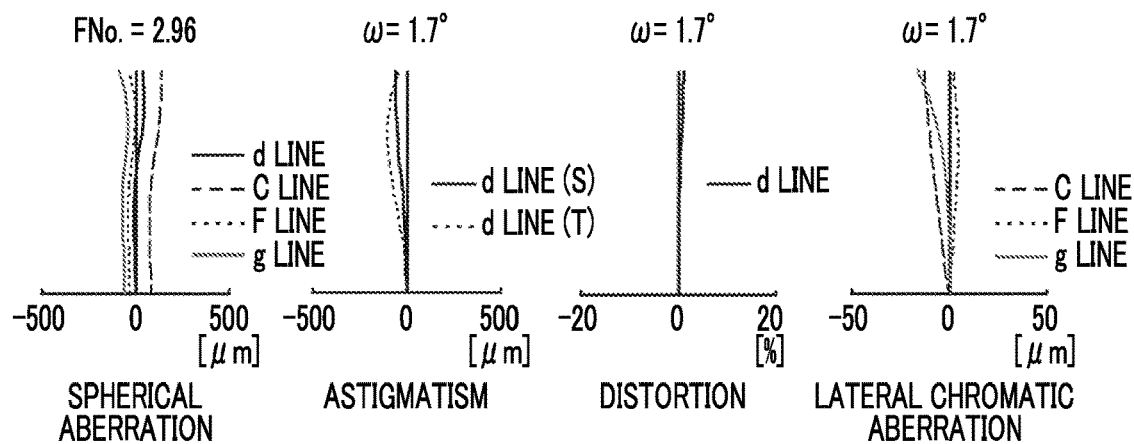

FIG. 10
EXAMPLE 2
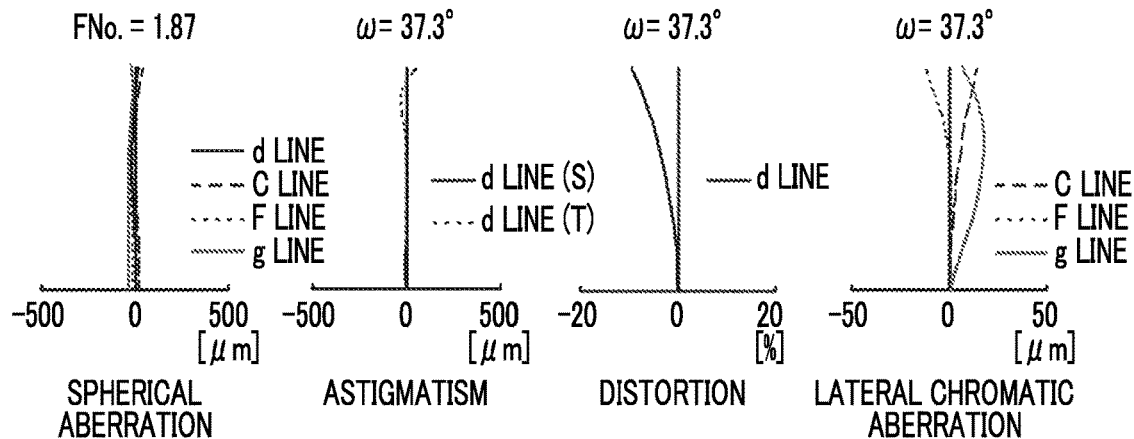
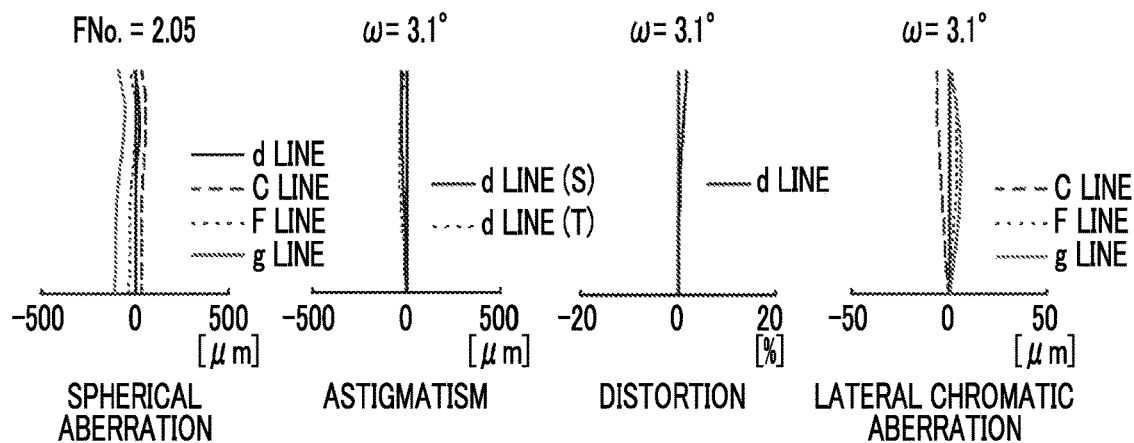
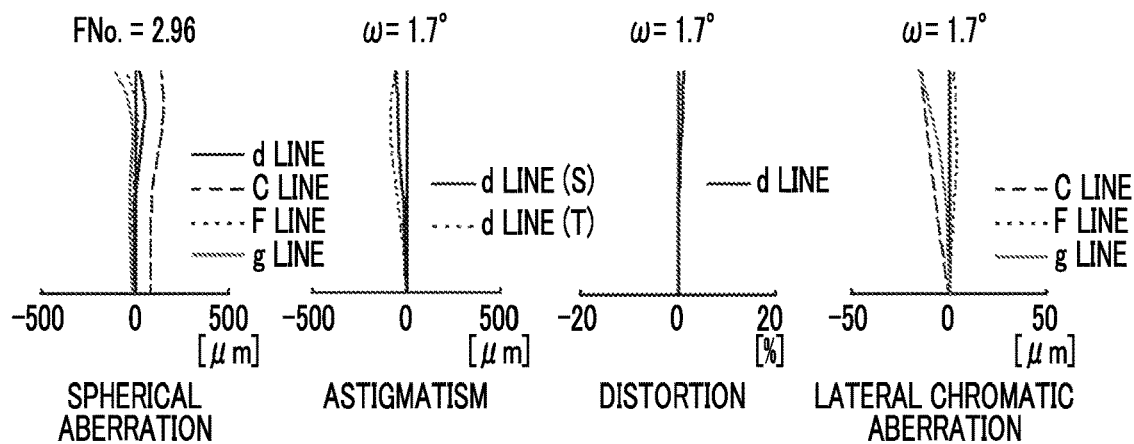

FIG. 11
EXAMPLE 3
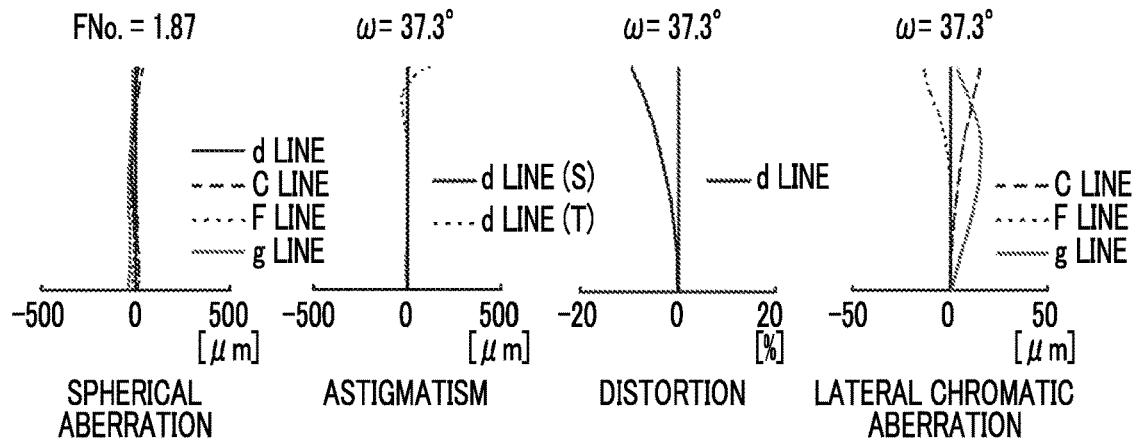
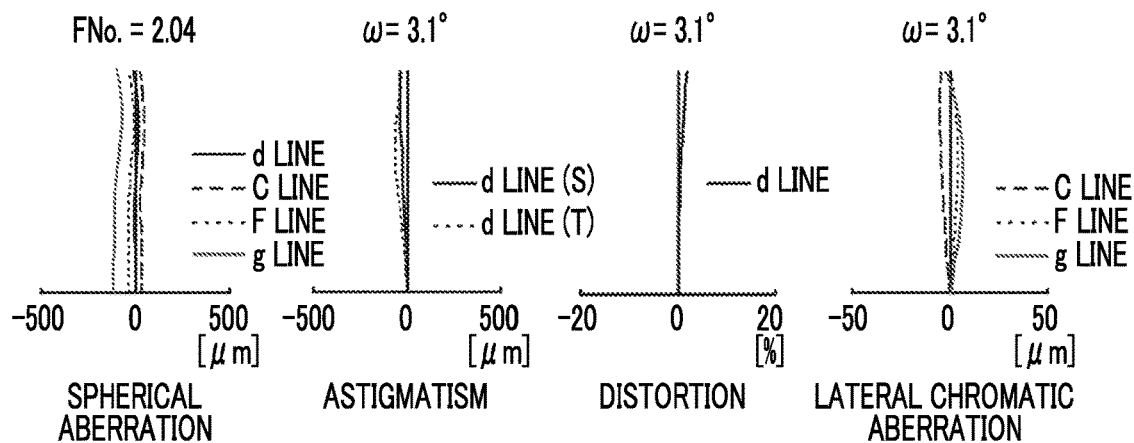
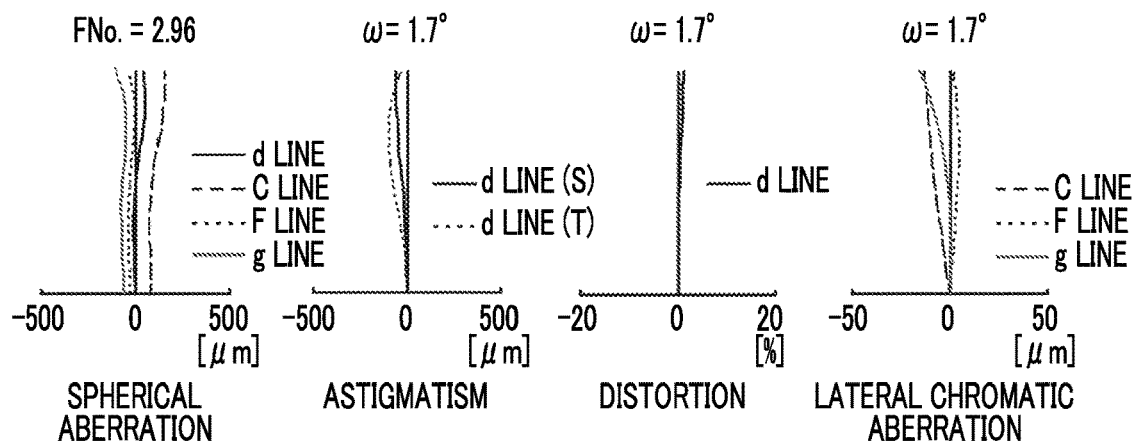

FIG. 12
EXAMPLE 4
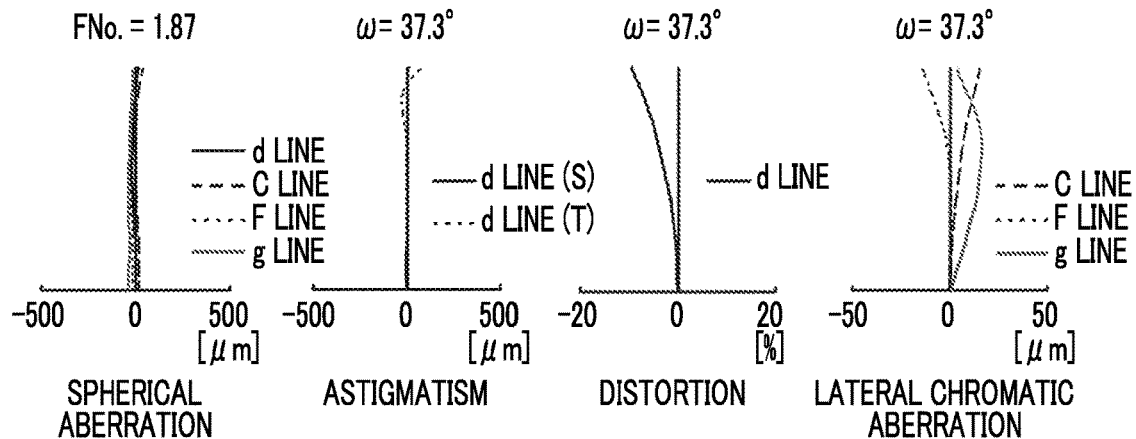
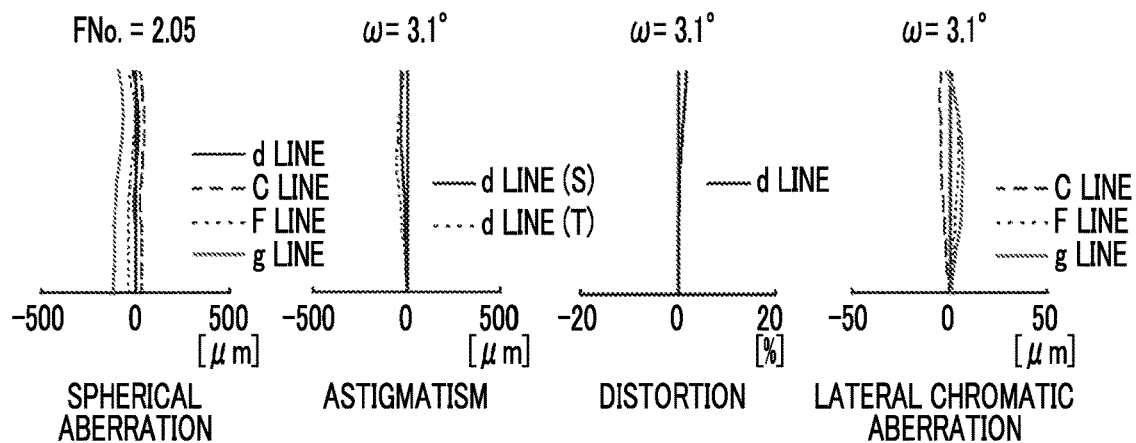
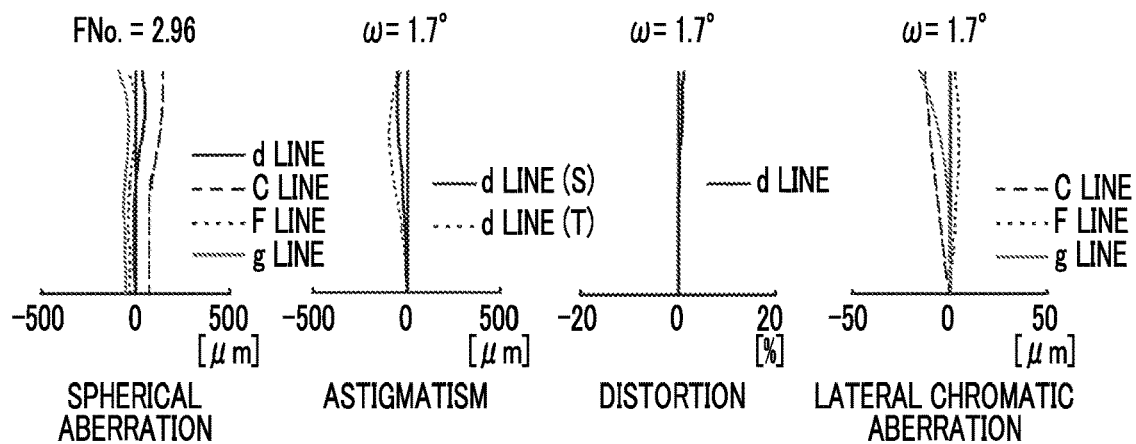

FIG. 13
EXAMPLE 5
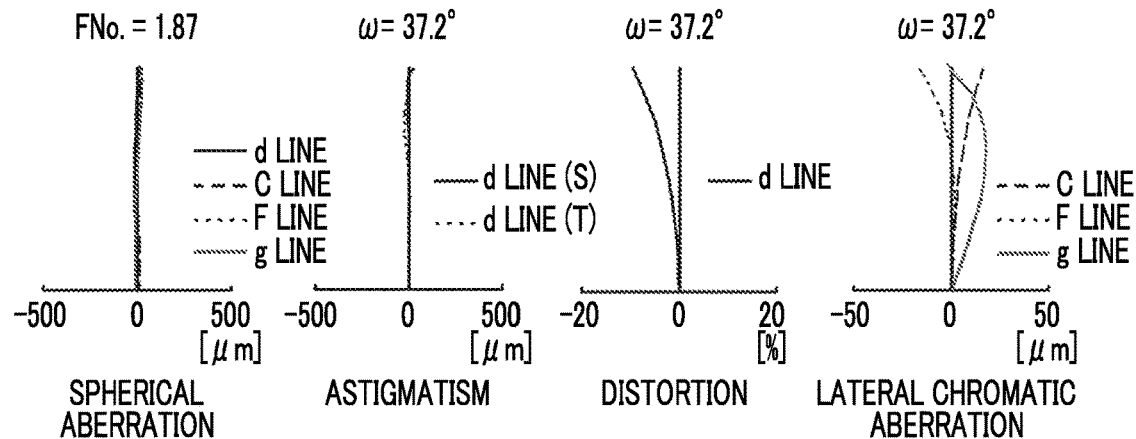
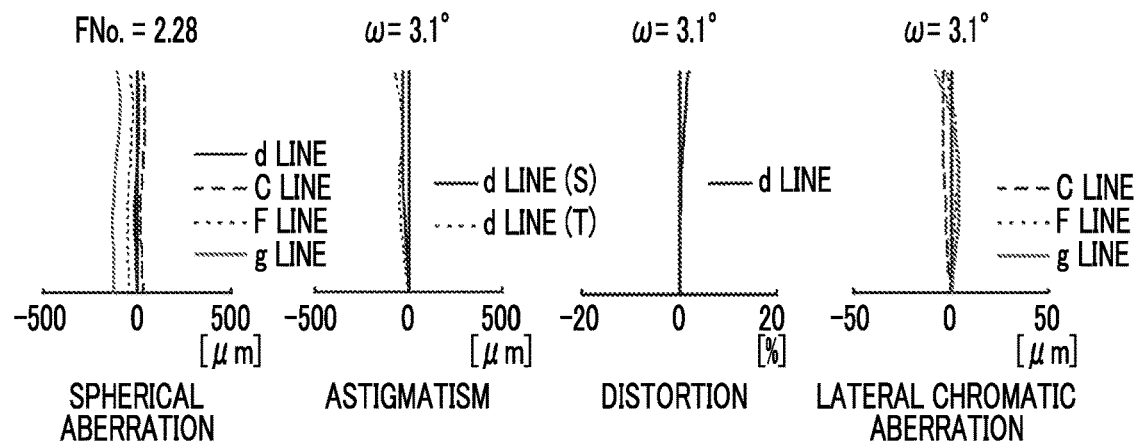
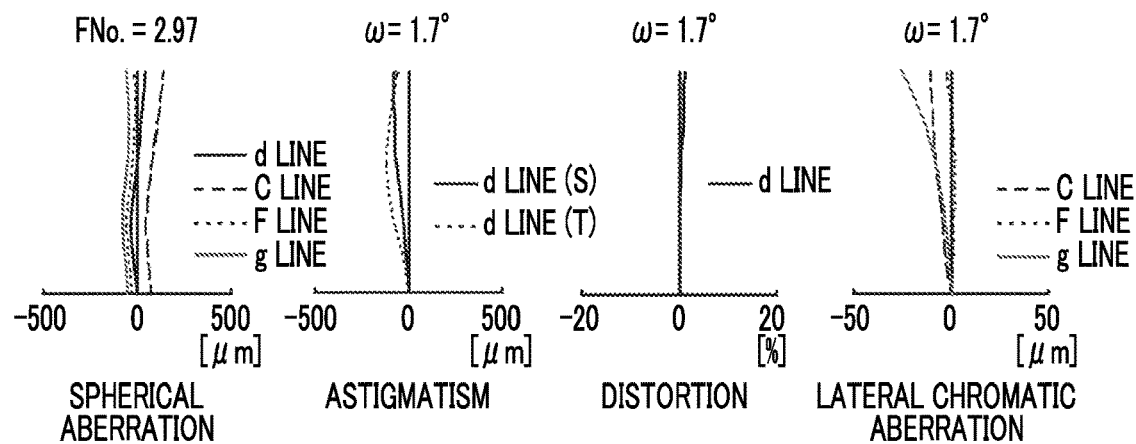

FIG. 14
EXAMPLE 6
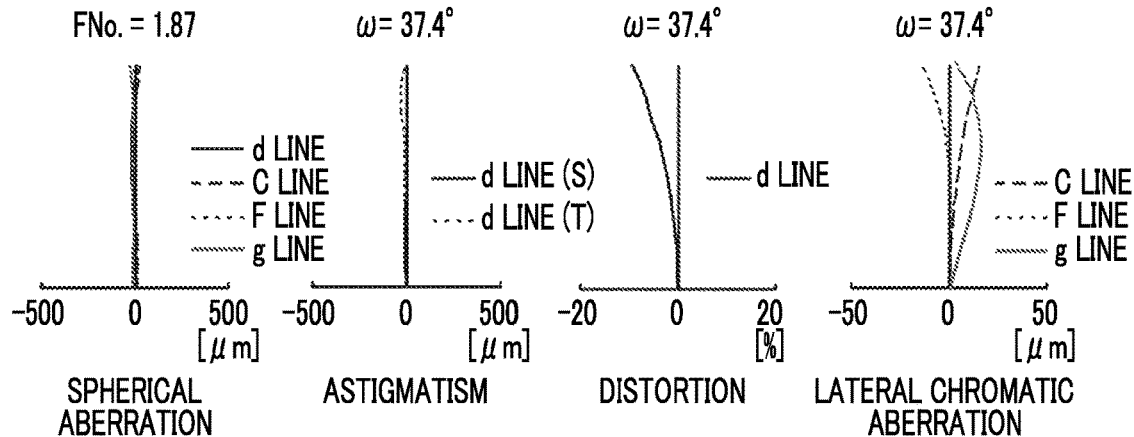
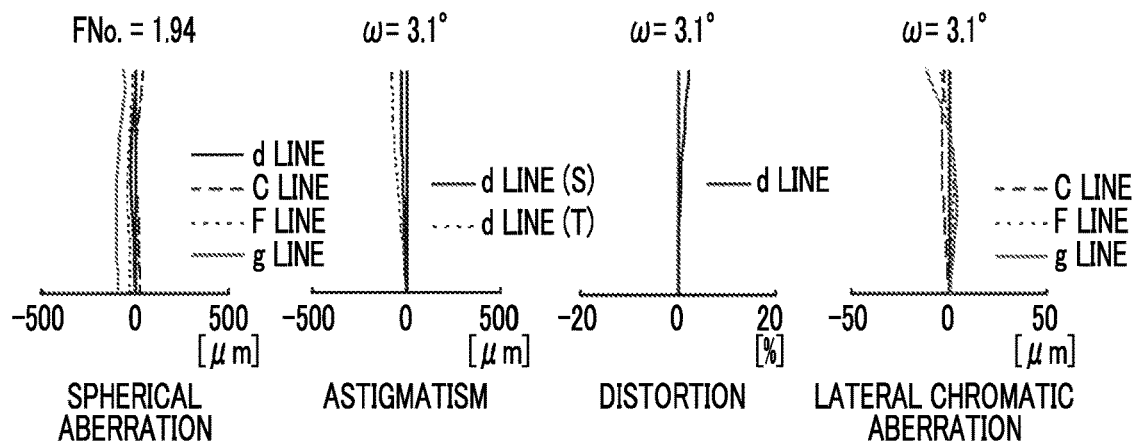
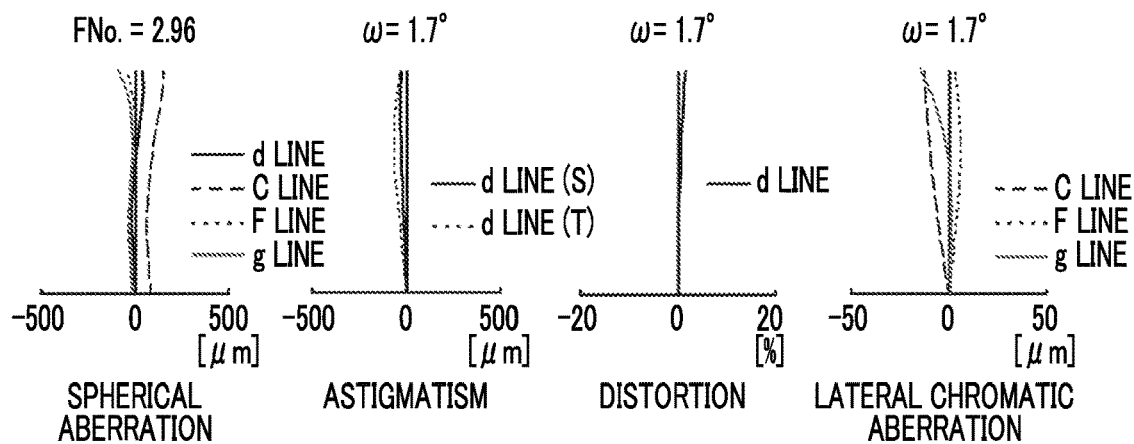

FIG. 15
EXAMPLE 7
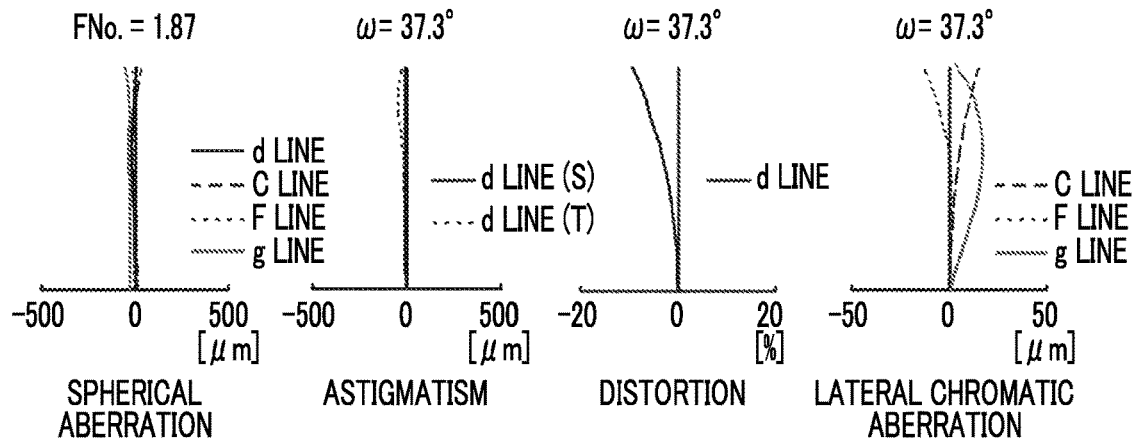
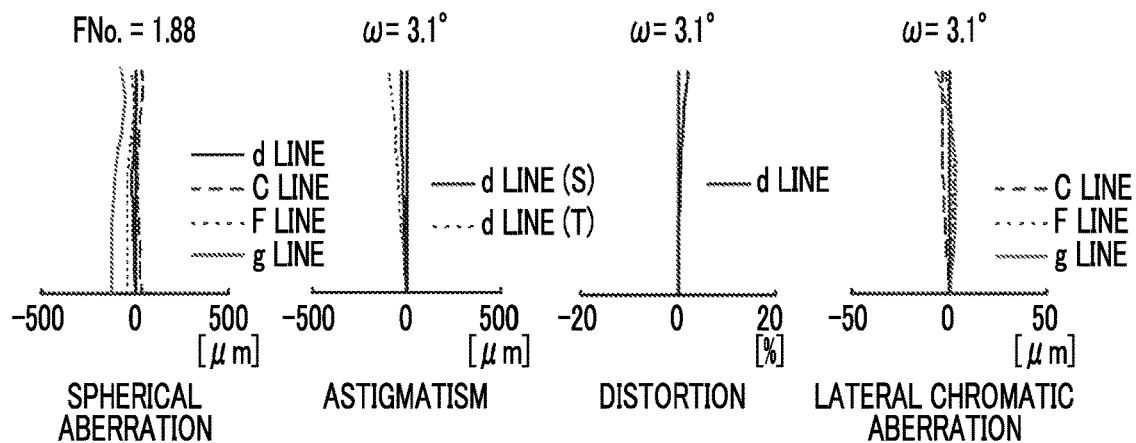
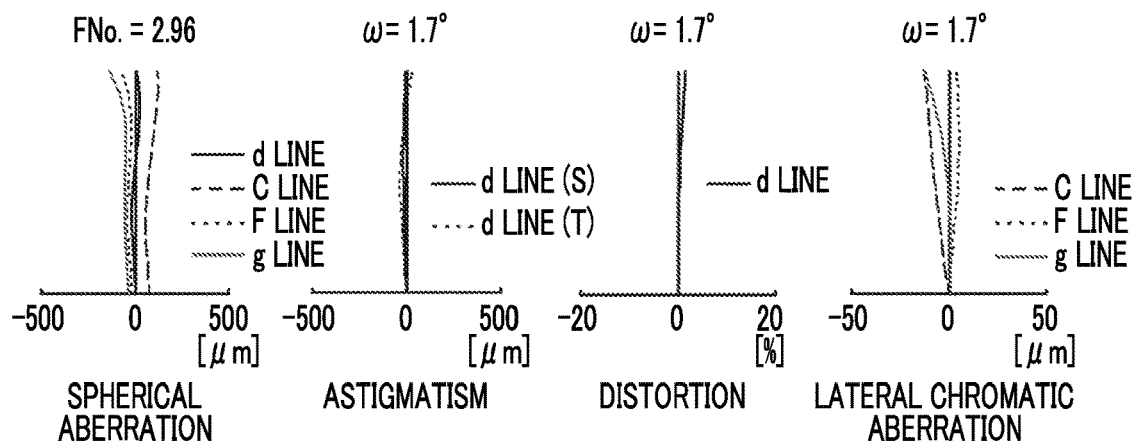

ZOOM LENS AND IMAGING APPARATUS

CROSS-REFERENCE TO RELATED APPLICATIONS

The present application claims priority under 35 U.S.C. §119 to Japanese Patent Application No. 2017-161025, filed on Aug. 24, 2017. The above application is hereby expressly incorporated by reference, in its entirety, into the present application.

BACKGROUND OF THE INVENTION

1. Field of the Invention

The present invention relates to a zoom lens and an imaging apparatus, and more particularly to a zoom lens, which is suitable for a broadcast camera, a movie imaging camera, a digital camera, a video camera, a surveillance camera, and the like, and an imaging apparatus comprising the zoom lens.

2. Description of the Related Art

In the related art, a zoom lens having a five-group configuration has been used in a broadcast camera, a movie imaging camera, and a digital camera. For example, JP2010-191334A, JP2006-349947A, JP2017-58589A, JP2016-173481A, and JP2015-161695A disclose zoom lenses of a type which can be used in the above-mentioned camera and in which a lens group having a positive refractive power is disposed to be closest to the object side and the total length of the lens system is invariant during zooming.

SUMMARY OF THE INVENTION

In the zoom lenses used in the cameras, there is a demand to achieve reduction in size and weight and have a high zoom ratio while having favorable performance. However, in the zoom lens of the above type, the lens group closest to the object side tends to become large and heavy in a case of increasing the zoom ratio.

The zoom lenses having a five-group configuration described in JP2010-191334A and JP2006-349947A each do not have a high zoom ratio. In order to sufficiently cope with the recent demands, the zoom lenses described in JP2017-58589A, JP2016-173481A, and JP2015-161695A are required to have a higher zoom ratio while maintaining reduction in size and weight.

The present invention has been made in consideration of the above-mentioned situations, and it is an object of the present invention to provide a zoom lens which has favorable performance by achieving a high zoom ratio while achieving reduction in size and weight, and an imaging apparatus comprising the zoom lens.

In order to solve the problems, a first zoom lens of the present invention consists of, in order from an object side to an image side: a first lens group that has a positive refractive power; a second lens group that has a positive refractive power; a third lens group that has a negative refractive power; a fourth lens group that has a negative refractive power; and a fifth lens group that has a positive refractive power. During zooming from the wide-angle end to the telephoto end, the first lens group and the fifth lens group remain stationary with respect to an image plane, the second lens group moves toward the image side, the third lens group and the fourth lens group move in a direction of an optical axis, and all distances between adjacent lens groups in the direction of the optical axis changes. In a state where an object at infinity is in focus, assuming that a focal length of the first lens group is f1 and a focal length of the third lens group is f3, Conditional Expression (1) is satisfied.

$$-10 < f1/f3 < -3.5 \quad (1)$$

In the first zoom lens of the present invention, it is preferable to satisfy Conditional Expression (1-1), and it is more preferable to satisfy Conditional Expression (1-2).

$$-8 < f1/f3 < -3.7 \quad (1-1)$$

$$-6 < f1/f3 < -3.9 \quad (1-2)$$

A second zoom lens of the present invention consists of, in order from an object side to an image side: a first lens group that has a positive refractive power; a second lens group that has a positive refractive power; a third lens group that has a negative refractive power; a fourth lens group that has a negative refractive power; and a fifth lens group that has a positive refractive power. During zooming from the wide-angle end to the telephoto end, the first lens group and the fifth lens group remain stationary with respect to an image plane, the second lens group moves toward the image side, the third lens group and the fourth lens group move in a direction of an optical axis, and all distances between adjacent lens groups in the direction of the optical axis changes. A lens closest to the image side in the first lens group is a positive lens. In addition, assuming that a refractive index of the lens closest to the image side in the first lens group at the d line is N1p, an Abbe number of the lens at the d line is ν1p, and a partial dispersion ratio of the lens between a g line and an F line is θgF1p, all Conditional Expressions (2), (3), and (4) are satisfied.

$$1.7 < N1p < 1.9 \quad (2)$$

$$45 < \nu1p < 58 \quad (3)$$

$$0.63 < \theta gF1p + 0.001625 \times \nu1p < 0.65 \quad (4)$$

In the second zoom lens of the present invention, it is preferable to satisfy at least one of Conditional Expression (2-1), (3-1), (4-1), or (4-2).

$$1.7 < N1p < 1.85 \quad (2-1)$$

$$46 < \nu1p < 56 \quad (3-1)$$

$$0.63 < \theta gF1p + 0.001625 \times \nu1p < 0.645 \quad (4-1)$$

$$0.635 < \theta gF1p + 0.001625 \times \nu1p < 0.645 \quad (4-2)$$

In the first and second zoom lens of the present invention, in a state where an object at infinity is in focus, assuming that a focal length of the first lens group is f1 and a focal length of the second lens group is f2, it is preferable to satisfy Conditional Expression (5), and it is more preferable to satisfy Conditional Expression (5-1).

$$0.2 < f1/f2 < 1 \quad (5)$$

$$0.4 < f1/f2 < 0.9 \quad (5-1)$$

In the first and second zoom lens of the present invention, it is preferable that the second lens group consists of a positive lens convex toward the object side.

In the first and second zoom lens of the present invention, it is preferable that first and second lenses from the object side in the third lens group are negative lenses, and assuming that a composite focal length of the first and second lenses from the object side in the third lens group is f3a and a focal length of the third lens group is f3, it is preferable to satisfy Conditional Expression (6), and it is more preferable to satisfy Conditional Expression (6-1).

$$0.3 < f3a/f3 < 0.7 \quad (6)$$

$$0.4 < f3a/f3 < 0.7 \quad (6\text{-}1)$$

In the first and second zoom lens of the present invention, it is preferable that the first lens group consists of, in order from the object side to the image side, a first-a sub-lens group that has a negative refractive power and remains stationary with respect to the image plane during focusing, a first-b sub-lens group that has a positive refractive power and moves in the direction of the optical axis during focusing, and a first-c sub-lens group that has a positive refractive power and moves in the direction of the optical axis along a locus different from the first-b sub-lens group during focusing.

In a case where the first lens group consists of the three sub-lens groups, it is preferable that the first-a sub-lens group consists of, in order from the object side to the image side, a biconcave lens, a biconvex lens, and a biconvex lens. Further, it is preferable that the first-b sub-lens group consists of, in order from the object side to the image side, a positive lens convex toward the object side and a biconvex lens. It is preferable that the first-c sub-lens group consists of a positive meniscus lens convex toward the object side.

In the first and second zoom lens of the present invention, it is preferable that a second lens from the image side in the first lens group is a positive lens. Assuming that a refractive index of the second lens from the image side in the first lens group at the d line is N2p and an Abbe number of the second lens at the d line is ν2p, and a partial dispersion ratio of the second lens between the g line and the F line is θgF2p, it is preferable to satisfy all Conditional Expressions (7), (8), and (9), and it is more preferable to satisfy all Conditional Expressions (7), (8), and (9-1).

$$\text{p } 1.48 < N2p < 1.6 \quad (7)$$

$$67 < \nu 2p < 83 \quad (8)$$

$$0.65 < \theta gF2p + 0.001625 \times \nu 2p < 0.68 \quad (9)$$

$$0.655 < \theta gF2p + 0.001625 \times \nu 2p < 0.675 \quad (9\text{-}1)$$

An imaging apparatus of the present invention comprises the zoom lens of the present invention.

In the present description, it should be noted that the terms "consisting of ~" and "consists of ~" are used in a substantial sense, and mean that the imaging lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" means that the group has a positive refractive power as a whole. Likewise, the term "~ group that has a negative refractive power" means that the group has a negative refractive power as a whole. The "lens group" and the "sub-lens group" each may be composed of a plurality of lens, or each may be composed of only one lens. Signs of refractive powers and surface shapes of the lenses are assumed as those in paraxial regions in a case where some lenses have aspheric surfaces. All the above-mentioned conditional expressions are based on the d line (a wavelength of 587.56 nm (nanometers)).

It should be noted that the partial dispersion ratio θgF between the g line and the F line of a certain lens is defined by θgF=(Ng−NF)/(NF−NC), where the refractive indexes of the lens at the g line (a wavelength of 435.8 nm (nanometers)), F line (a wavelength of 486.1 nm (nanometers)), and C line (a wavelength of 656.3 nm (nanometers)) are Ng, NF, and NC, respectively.

According to the present invention, in the zoom lens having a five-group configuration, the sign of the refractive power of each lens group and the behavior of each lens group during zooming are appropriately set, and the predetermined conditional expressions are satisfied. Thereby, it is possible to a zoom lens which has favorable performance by achieving a high zoom ratio while achieving reduction in size and weight, and an imaging apparatus comprising the zoom lens.

BRIEF DESCRIPTION OF THE DRAWINGS

FIG. 9 is a diagram of aberrations of the zoom lens of Example 1 of the present invention.

FIG. 10 is a diagram of aberrations of the zoom lens of Example 2 of the present invention.

FIG. 11 is a diagram of aberrations of the zoom lens of Example 3 of the present invention.

FIG. 12 is a diagram of aberrations of the zoom lens of Example 4 of the present invention.

FIG. 13 is a diagram of aberrations of the zoom lens of Example 5 of the present invention.

FIG. 14 is a diagram of aberrations of the zoom lens of Example 6 of the present invention.

FIG. 15 is a diagram of aberrations of the zoom lens of Example 7 of the present invention.

DESCRIPTION OF THE PREFERRED EMBODIMENTS

Figure 1:
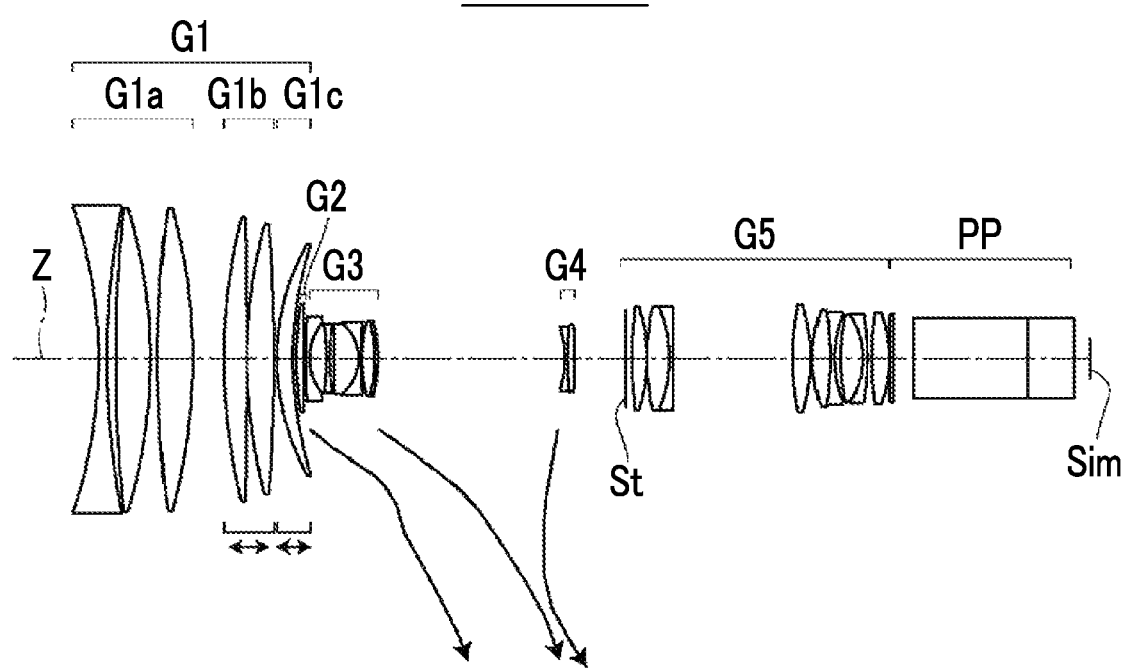
FIG. 1 is a cross-sectional view illustrating a lens configuration and a movement locus of a zoom lens of Example 1 of the present invention at the wide-angle end.
Figure 2:
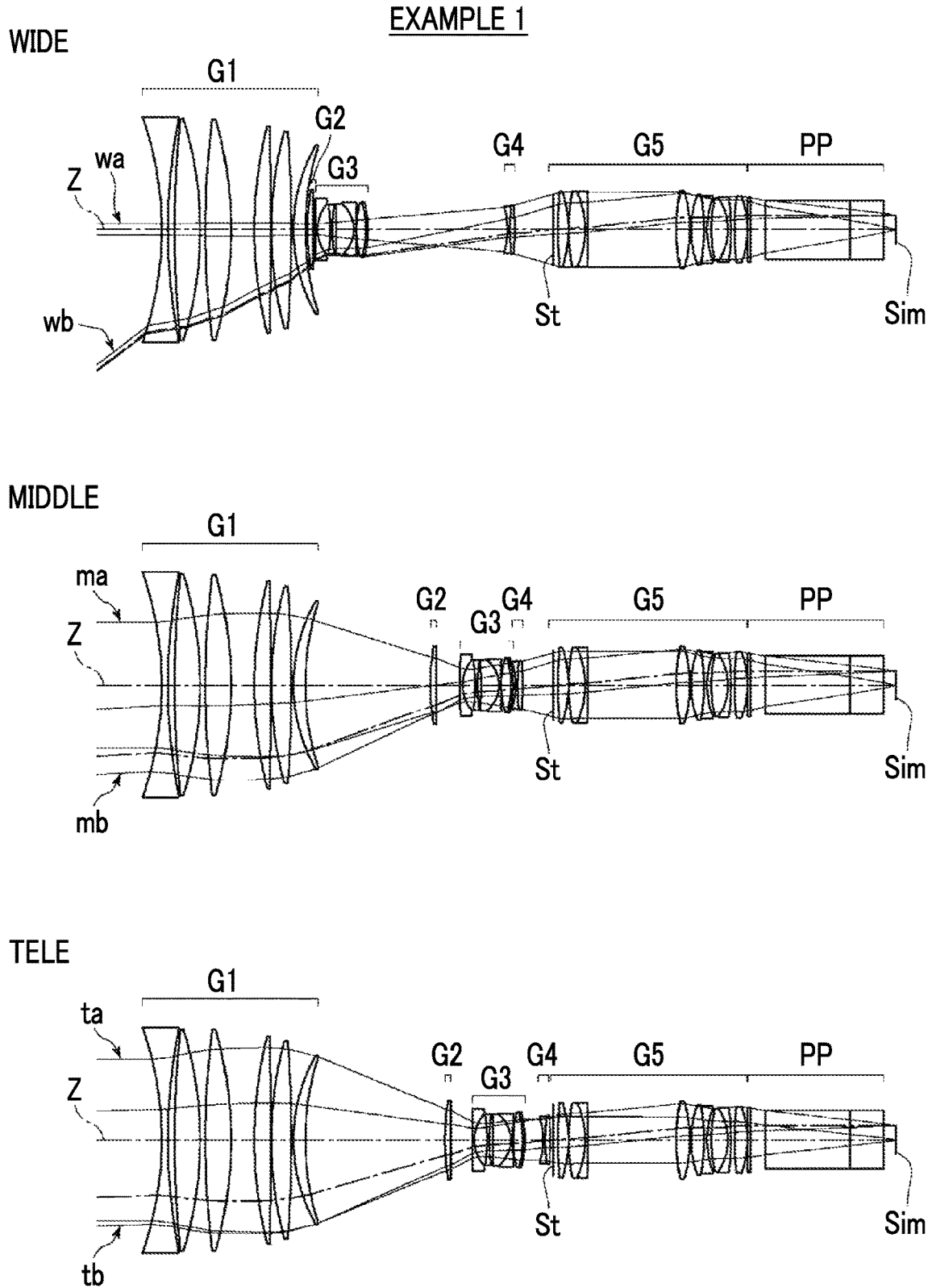
FIG. 2 is a cross-sectional view illustrating a lens configuration and optical paths of the zoom lens of Example 1 of the present invention at the wide-angle end, the middle focal length state, and the telephoto end.

Hereinafter, embodiments of the present invention will be described with reference to drawings. FIG. 1 is a cross-sectional view illustrating a lens configuration of a zoom lens of an embodiment of the present invention at the wide-angle end. FIG. 2 is a cross-sectional view additionally illustrating optical paths of the zoom lens in the respective states. The examples shown in FIGS. 1 and 2 correspond to the zoom lens of Example 1 to be described later. FIGS. 1 and 2 each show a state where the object at infinity is in focus, where the left side of the drawing is the object side and the right side of the drawing is the image side.

In FIG. 2, the upper part labeled by "WIDE" shows the wide-angle end state, the middle part labeled by "MIDDLE" shows the middle focal length state, and the lower part labeled by "TELE" shows the telephoto end state. Further, FIG. 2 shows rays including on-axis rays wa and rays with the maximum angle of view wb at the wide-angle end state, on-axis rays ma and rays with the maximum angle of view mb at the middle focal length state, and on-axis rays to and rays with the maximum angle of view tb at the telephoto end state.

Further, FIGS. 1 and 2 show an example in which an optical member PP having an incident surface and an exit surface parallel to each other is disposed between the zoom lens and the image plane Sim. The optical member PP is a member assumed to include various filters, a prism, a cover glass, and the like. Although the optical member PP in FIGS. 1 and 2 consists of three members, the number of members composing the optical member PP is not limited to that in FIG. 1, and the optical member PP may be omitted.

The zoom lens of the present embodiment consists of, in order from the object side to the image side along an optical axis Z, a first lens group G1 that has a positive refractive power; a second lens group G2 that has a positive refractive power; a third lens group G3 that has a negative refractive power; a fourth lens group G4 that has a negative refractive power; and a fifth lens group G5 that has a positive refractive power. During zooming from the wide-angle end to the telephoto end, the first lens group G1 and the fifth lens group G5 remain stationary with respect to an image plane Sim, the second lens group G2 moves toward the image side, the third lens group G3 and the fourth lens group G4 move in a direction of an optical axis, and all distances between adjacent lens groups in the direction of the optical axis changes. The basic configuration of the zoom lens of the present embodiment has been described above. In FIG. 1, movement loci of the respective lens groups during zooming from the wide-angle end to the telephoto end under each lens group moving during zooming are schematically indicated by arrows.

By forming the first lens group G1 closest to the object side as a lens group having a positive refractive power, it is possible to reduce the total length of the lens system. As a result, there is an advantage in achieving reduction in size. Further, by forming the fifth lens group G5 closest to the image side as the positive lens group, it is possible to suppress an increase in incidence angle of the principal ray of the off-axis rays incident onto the image plane Sim. As a result, it is possible to suppress shading.

The second lens group G2 has a positive refractive power, and is formed as a movable group that moves from the object side to the image side during zooming. Thereby, it is possible to minimize the effective diameter of the second lens group G2 on the telephoto side, and it is possible to minimize the outer diameter of the second lens group G2. As a result, it is possible to achieve reduction in size and weight.

The third lens group G3 may have a main zooming function. The second lens group G2 having a positive refractive power is disposed between the third lens group G3 and the first lens group G1 remaining stationary during zooming, and the second lens group G2 is moved from the object side to the image side during zooming. Thereby, it is possible to suppress change in spherical aberration during zooming while ensuring a high zoom ratio.

The fourth lens group G4 is able to correct the deviation of the image plane position during zooming. Further, by making the fourth lens group G4 as a negative lens group, it is possible to perform a zooming operation while moving the third lens group G3 and the fourth lens group G4 in cooperation with each other. Therefore, it is possible to suppress fluctuation in various aberrations during zooming, and there is an advantage in achieving a high zoom ratio.

In the example of FIG. 1, the first lens group G1 consists of six lenses, the second lens group G2 consists of one lens, the third lens group G3 consists of six lenses, the fourth lens group G4 consists of two lenses, and the fifth lens group G5 consists of an aperture stop St and nine lenses.

Assuming that a focal length of the first lens group G1 is f1 and a focal length of the third lens group G3 is f3, it is preferable that the zoom lens satisfies Conditional Expression (1). By not allowing the result of the conditional expression (1) to be equal to or less than the lower limit, the refractive power of the third lens group G3 is prevented from becoming excessively strong, and thus it is possible to suppress fluctuation in aberrations during zooming. By not allowing the result of Conditional Expression (1) to be equal to or less than the upper limit, the refractive power of the first lens group G1 is prevented from becoming excessively strong. Thus, it becomes easy to correct spherical aberration and longitudinal chromatic aberration at the telephoto end. Further, by not allowing the result of Conditional Expression (1) to be equal to or greater than the upper limit, the focal length of the third lens group G3 is prevented from becoming excessively long. Thus, it is possible to suppress the amount of movement of the third lens group G3 caused by zooming, it becomes easy to achieve both an increase in zoom ratio and reduction in size and weight. In addition, in a case of a configuration in which Conditional Expression (1-1) is satisfied, it is possible to obtain more favorable characteristics. In a case of a configuration in which Conditional Expression (1-2) is satisfied, it is possible to obtain further more favorable characteristics.

$$-10 < f1/f3 < -3.5 \qquad (1)$$

$$-8 < f1/f3 < -3.7 \qquad (1-1)$$

$$-6 < f1/f3 < -3.9 \qquad (1-2)$$

In a case where a lens closest to the image side in the first lens group G1 is a positive lens, assuming that a refractive index of the positive lens closest to the image side in the first lens group G1 at the d line is N1p, an Abbe number of the lens at the d line is ν1p, and a partial dispersion ratio of the lens between the g line and the F line is θgF1p, it is preferable to satisfy all Conditional Expressions (2), (3), and (4). By selecting a material satisfying all Conditional Expressions (2), (3), and (4), it is possible to satisfactorily correct primary and secondary longitudinal chromatic aberrations and spherical aberration on the telephoto side, and it is possible to satisfactorily correct lateral chromatic aberration on the wide-angle side. Therefore, there is an advantage in achieving a high zoom ratio. In addition, in a case of a configuration in which Conditional Expression (2-1) is satisfied instead of Conditional Expression (2), it is possible to obtain more favorable characteristics. In a case of a configuration in which Conditional Expression (3-1) is satisfied instead of Conditional Expression (3), it is possible to obtain more favorable characteristics. In a case of a configuration in which Conditional Expression (4-1) is satisfied instead of Conditional Expression (4), it is possible to obtain more favorable characteristics. In a case of a configuration in which Conditional Expression (4-2) is satisfied instead of Conditional Expression (4), it is possible to obtain further more favorable characteristics.

$$1.7<N1p<1.9 \quad (2)$$

$$45<\nu1p<58 \quad (3)$$

$$0.63<\theta gF1p+0.001625\times\nu1p<0.65 \quad (4)$$

$$1.7<N1p<1.85 \quad (2\text{-}1)$$

$$46<\nu1p<56 \quad (3\text{-}1)$$

$$0.63<\theta gF1p+0.001625\times\nu1p<0.645 \quad (4\text{-}1)$$

$$0.635<\theta gF1p+0.001625\times\nu1p<0.645 \quad (4\text{-}2)$$

In a state where an object at infinity is in focus, assuming that a focal length of the first lens group G1 is f1 and a focal length of the second lens group G2 is f2, it is preferable to satisfy Conditional Expression (5). By not allowing the result of Conditional Expression (5) to be equal to or less than the lower limit, it is possible to minimize the effective diameter of the second lens group G2 on the telephoto side, and it is possible to minimize the outer diameter of the second lens group G2. Thus, it is possible to achieve reduction in size and weight. By not allowing the result of Conditional Expression (5) to be equal to or greater than the upper limit, the refractive power of the second lens group G2 is prevented from becoming excessively strong, and a principal point position of the combined optical system of the first lens group G1 and the second lens group G2 is prevented from becoming excessively close to the image side at the wide-angle end. This configuration is able to make contribution to minimizing the total length of the lens system. In addition, in a case of a configuration in which Conditional Expression (5-1) is satisfied, it is possible to obtain more favorable characteristics.

$$0.2<f1/f2<1 \quad (5)$$

$$0.4<f1/f2<0.9 \quad (5\text{-}1)$$

The second lens group G2 may be configured to consist of a positive lens convex toward the object side. In such a case, it is possible to satisfactorily correct distortion at the wide-angle end, and it is possible to suppress occurrence of spherical aberration at the telephoto end.

First and second lenses from the object side in the third lens group G3 may be configured to be negative lenses. In such a case, by placing a negative refractive power at the position on the object side in the third lens group G3, distortion at the wide-angle end is corrected while a high zoom ratio is achieved. Thus, there is an advantage in a wide-angle configuration.

In a case where first and second lenses from the object side in the third lens group G3 are negative lenses, assuming that a composite focal length of the first and second lenses from the object side in the third lens group G3 is f3a and a focal length of the third lens group G3 is f3, it is preferable to satisfy Conditional Expression (6). By not allowing the result of Conditional Expression (6) to be equal to or less than the lower limit, refractive powers of two negative lenses are prevented from becoming excessively strong, and it is possible to suppress occurrence of high-order spherical aberration at the telephoto end. It should be noted that the term "high order" means 5th or more order. By not allowing the result of Conditional Expression (6) to be equal to or greater than the upper limit, refractive powers of two negative lenses are prevented from becoming excessively weak. As a result, it becomes easy to correct distortion and astigmatism at the wide-angle end, and it becomes easy to achieve a high zoom ratio. In addition, in a case of a configuration in which Conditional Expression (6-1) is satisfied, it is possible to obtain more favorable characteristics.

$$0.3<f3a/f3<0.7 \quad (6)$$

$$0.4<f3a/f3<0.7 \quad (6\text{-}1)$$

With regard to focusing, focusing can be performed by moving some lenses in the first lens group G1 as focusing lenses. For example, in a manner similar to the example of FIG. 1, the first lens group G1 may be configured to consist of, in order from the object side to the image side, a first-a sub-lens group G1a that has a negative refractive power and remains stationary with respect to the image plane Sim during focusing, a first-b sub-lens group G1b that has a positive refractive power and moves in the direction of the optical axis during focusing, and a first-c sub-lens group G1c that has a positive refractive power and moves in the direction of the optical axis along a locus different from the first-b sub-lens group G1b during focusing. That is, in the example of FIG. 1, the floating focus method is adopted in which the first-b sub-lens group G1b and the first-c sub-lens group G1c are moved to the object side with distances different from each other during focusing. By adopting the configuration, it is possible to reduce fluctuation in spherical aberration and longitudinal chromatic aberration caused by focusing. In addition, the horizontal arrows shown below the first-b sub-lens group G1b and the first-c sub-lens group G1c in FIG. 1 mean that these two sub-lens groups move during focusing.

In a case where the first lens group G1 consists of the three sub-lens groups, the first-a sub-lens group G1a may be configured to consist of, in order from the object side to the image side, a biconcave lens, a biconvex lens, and a biconvex lens. In such a case, a biconcave lens is disposed to be closest to the object side of the first-a sub-lens group G1a, whereby it is possible to suppress occurrence of high-order spherical aberration on the telephoto side. Then, a biconvex lens is disposed on the image side of the biconcave lens, whereby it is possible to correct distortion at the wide-angle end.

The first-b sub-lens group G1b may be configured to consist of, in order from the object side to the image side, a positive lens convex toward the object side and a biconvex lens. In such a case, it is possible to suppress fluctuation in spherical aberration during focusing.

The first-c sub-lens group G1c may be configured to consist of a positive meniscus lens convex toward the object side. In such a case, it is possible to suppress occurrence of spherical aberration at the telephoto end while achieving reduction in size.

In a case where a second lens from the image side in the first lens group G1 is a positive lens, assuming that a refractive index of the second lens from the image side in the first lens group G1 at the d line is N2p and an Abbe number of the second lens at the d line is ν2p, and a partial dispersion ratio of the second lens between the g line and the F line is θgF2p, it is preferable to satisfy all Conditional Expressions (7), (8), and (9). By selecting a material satisfying all Conditional Expressions (7), (8), and (9), it is possible to satisfactorily correct primary and secondary longitudinal chromatic aberration and spherical aberration on the telephoto side, and it is possible to satisfactorily correct lateral chromatic aberration on the wide-angle side. Therefore, there is an advantage in achieving a high zoom ratio. In addition, in a case of a configuration in which Conditional Expression (9-1) is satisfied instead of Conditional Expression (9), it is possible to obtain more favorable characteristics.

$$1.48 < N2p < 1.6 \quad (7)$$

$$67 < v2p < 83 \quad (8)$$

$$0.65 < \theta gF2p + 0.001625 \times v2p < 0.68 \quad (9)$$

$$0.655 < \theta gF2p + 0.001625 \times v2p < 0.675 \quad (9\text{-}1)$$

In particular, the lens closest to the image side in the first lens group G1 is set as a positive lens, and the positive lens satisfies all Conditional Expression (2), (3), and (4), and the second lens from the image side in the first lens group G1 is set as a positive lens, and the positive lens satisfies all Conditional Expression (7), (8), and (9). In this case, it is possible to more satisfactorily correct primary and secondary longitudinal chromatic aberrations and spherical aberration on the telephoto side and lateral chromatic aberration on the wide-angle side. As result, there is an advantage in achieving high zoom ratio.

In a manner similar to the example of FIG. 1, the fourth lens group G4 may be configured to consist of, in order from the object side to the image side, a negative lens and a positive lens. In the zoom lens of the present embodiment, the fourth lens group G4 tends to be disposed in the middle of the divergent light, in a case where the lenses are arranged in this order, it is possible to suppress occurrence of spherical aberration and astigmatism. At that time, in a case where the fourth lens group G4 is configured to consist of, in order from the object side to the image side, a biconcave lens and a positive lens convex toward the object side, it is possible to satisfactorily suppress occurrence of spherical aberration and astigmatism. Further, by adopting a configuration in which the fourth lens group G4 moving during zooming consists of two lenses including a negative lens and a positive lens, there is an advantage in achieving both favorable aberration correction and reduction in weight.

The above-mentioned preferred configurations and available configurations may be arbitrary combinations, and it is preferable to selectively adopt the configurations in accordance with required specification. According to the present embodiment, it is possible to realize a zoom lens which has favorable optical performance by achieving a high zoom ratio while achieving reduction in size and weight and by satisfactorily correcting various aberrations. The "high zoom ratio" described herein means a zoom ratio of 20 times or more.

Next, two preferred configuration examples, in which the above-mentioned conditional expressions are considered, and effects thereof will be described. The first configuration example has the basic configuration of the zoom lens of the present embodiment described above, and satisfies Conditional Expression (1). According to the first configuration example, it is possible to obtain a configuration that is advantageous for compatibility of high zoom ratio and reduction in size, reduction in weight, favorable correction of various aberrations, and suppression of fluctuation in aberrations during zooming.

The second configuration example has a basic configuration of the above-mentioned zoom lens according to the present embodiment, the lens closest to the image side in the first lens group G1 is a positive lens, and this positive lens satisfies Conditional Expressions (2), (3), and (4). According to the second configuration example, it is possible to obtain a configuration that is advantageous for a high zoom ratio, reduction in size, reduction in weight, suppression of fluctuation in aberrations during zooming, and favorable correction of various aberrations, particularly, favorable correction of secondary spectrum.

Next, numerical examples of the zoom lens of the present invention will be described.

EXAMPLE 1

FIGS. 1 and 2 are cross-sectional views of a zoom lens of Example 1, and an illustration method thereof is as described above. Therefore, repeated description is partially omitted herein. The zoom lens of Example 1 has a basic configuration of the above-mentioned zoom lens of the present embodiment. The first lens group G1 consists of six single lenses. The first lens group G1 consists of, in order from the object side to the image side, a first-a sub-lens group G1a that has a negative refractive power and remains stationary with respect to the image plane Sim during focusing, a first-b sub-lens group G1b that has a positive refractive power and moves in the direction of the optical axis during focusing from the object at infinity to the close-range object, and a first-c sub-lens group G1c that has a positive refractive power and moves in the direction of the optical axis along a locus different from the first-b sub-lens group G1b during focusing from the object at infinity to the close-range object. The first-a sub-lens group G1a consists of three lenses including first to third lenses from the object side in the first lens group G1. The first-b sub-lens group G1b consists of two lenses including fourth to fifth lenses from the object side in the first lens group G1. The first-c sub-lens group G1c consists of one lens closest to the image side in the first lens group G1. The second lens group G2 consists of one positive lens convex toward the object side. The third lens group G3 consists of, in order from the object side to the image side, two negative lenses and two sets of cemented lenses. The fourth lens group G4 consists of a set of cemented lenses in which a negative lens and a positive lens are cemented in order from the object side to the image side. The fifth lens group G5 consists of an aperture stop St and nine lenses in order from the object side to the image side. The outline of the zoom lens of Example 1 has been described above.

Table 1 shows basic lens data of the zoom lens of Example 1, Table 2 shows variable surface distances, and Table 3 shows aspheric surface coefficients thereof. In Table 1, the column of the surface number shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line (a wavelength of 587.6 nm (nanometers)), the column of vd shows an Abbe number of each constituent element at the d line, and the column of θgF shows a partial dispersion ratio of each constituent element between the g line (a wavelength of 435.8 nm (nanometers)) and the F line (a wavelength of 486.1 nm (nanometers)).

In Table 1, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the variable surface distances during zooming are referenced by the reference signs DD[ ], and are written into places of D, where object side surface numbers of distances are noted in[ ].

In the range of Table 2, values of the zoom ratio Zr, the focal length f, the F number FNo., the maximum total angle of view 2ω, and the variable surface distance are based on the d line. (°) in the place of 2ω indicates that the unit thereof is a degree. In Table 2, values in the wide-angle end state, the middle focal length state, and the telephoto end state are respectively shown in the columns labeled by WIDE, MIDDLE, and TELE. The values of Tables 1 and 2 are values in a state where the object at infinity is in focus.

In Table 1, the reference sign * is attached to surface numbers of aspheric surfaces, and numerical values of the paraxial radius of curvature are written into the column of the radius of curvature of the aspheric surface. Table 3 shows surface numbers of the aspheric surfaces, and aspheric surface coefficients of the respective aspheric surfaces. The "E±n" (n: an integer) in numerical values of the aspheric surface coefficients of Table 3 indicates "×10±n". The aspheric surface coefficients are values of the coefficients KA and Am (m=3, 4, 5, . . . , 20) in aspheric surface expression represented as the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Surface Number | R | D | Nd | vd | θgF |
|---|---|---|---|---|---|
| 1 | −135.93425 | 2.500 | 1.80610 | 33.27 | 0.58845 |
| 2 | 235.51194 | 2.500 | | | |
| 3 | 416.68310 | 10.000 | 1.43387 | 95.18 | 0.53733 |
| 4 | −148.21796 | 2.000 | | | |
| 5 | 344.64546 | 9.878 | 1.43387 | 95.18 | 0.53733 |
| 6 | −164.15717 | 9.026 | | | |
| 7 | 168.35588 | 6.500 | 1.43387 | 95.18 | 0.53733 |
| 8 | −2629.18104 | 0.120 | | | |
| 9 | 151.64874 | 7.750 | 1.53775 | 74.70 | 0.53936 |

TABLE 1-continued

Example 1

| Surface Number | R | D | Nd | vd | θgF |
|---|---|---|---|---|---|
| 10 | −571.01983 | 0.871 | | | |
| 11 | 67.78028 | 4.625 | 1.76385 | 48.49 | 0.55898 |
| 12 | 109.24577 | DD[12] | | | |
| *13 | 89.42048 | 2.220 | 1.65412 | 39.68 | 0.57378 |
| 14 | −25227.04339 | DD[14] | | | |
| *15 | −4760.61615 | 0.850 | 2.00100 | 29.13 | 0.59952 |
| 16 | 15.56183 | 5.000 | | | |
| 17 | −59.59686 | 0.800 | 2.00100 | 29.13 | 0.59952 |
| 18 | 62.44572 | 1.375 | | | |
| 19 | −742.47320 | 7.000 | 1.89286 | 20.36 | 0.63944 |
| 20 | −13.17027 | 0.810 | 1.89190 | 37.13 | 0.57813 |
| 21 | 227.73974 | 0.120 | | | |
| 22 | 41.02637 | 3.760 | 1.61800 | 63.33 | 0.54414 |
| 23 | −38.06798 | 0.800 | 1.90366 | 31.31 | 0.59481 |
| 24 | −45.25425 | DD[24] | | | |
| 25 | −30.55105 | 0.810 | 1.88300 | 40.76 | 0.56679 |
| 26 | 83.19428 | 2.000 | 1.95906 | 17.47 | 0.65993 |
| 27 | −162.11741 | DD[27] | | | |
| 28(St) | ∞ | 1.823 | | | |
| 29 | 181.72606 | 4.111 | 1.76385 | 48.49 | 0.55898 |
| *30 | −48.88025 | 0.120 | | | |
| 31 | 78.21391 | 6.362 | 1.51633 | 64.14 | 0.53531 |
| 32 | −37.71668 | 1.235 | 1.84850 | 43.79 | 0.56197 |
| 33 | −447.47223 | 34.250 | | | |
| 34 | 79.27767 | 5.127 | 1.58267 | 46.42 | 0.56716 |
| 35 | −54.98298 | 0.500 | | | |
| 36 | 39.72760 | 5.010 | 1.48749 | 70.24 | 0.53007 |
| 37 | −81.51851 | 1.200 | 1.91082 | 35.25 | 0.58224 |
| 38 | 34.02617 | 1.684 | | | |
| 39 | 55.57108 | 6.492 | 1.51633 | 64.14 | 0.53531 |
| 40 | −22.27774 | 1.208 | 1.89190 | 37.13 | 0.57813 |
| 41 | −88.38020 | 1.360 | | | |
| 42 | 117.75429 | 5.012 | 1.51633 | 64.14 | 0.53531 |
| 43 | −37.81623 | 0.200 | | | |
| 44 | ∞ | 1.000 | 1.51633 | 64.14 | 0.53531 |
| 45 | ∞ | 5.778 | | | |
| 46 | ∞ | 33.000 | 1.60859 | 46.44 | 0.56664 |
| 47 | ∞ | 13.200 | 1.51633 | 64.05 | 0.53463 |
| 48 | ∞ | 4.555 | | | |

TABLE 2

Example 1

| | WIDE | MIDDLE | TELE |
|---|---|---|---|
| Zr | 1.0 | 12.6 | 23.1 |
| f | 8.104 | 102.025 | 187.356 |
| FNo. | 1.87 | 2.05 | 2.96 |
| 2ω(°) | 74.6 | 6.2 | 3.4 |
| DD[12] | 0.883 | 48.492 | 54.029 |
| DD[14] | 0.796 | 9.189 | 8.244 |
| DD[24] | 53.861 | 0.972 | 7.104 |
| DD[27] | 14.967 | 11.853 | 1.129 |

TABLE 3

Example 1

| Surface Number | 13 | 15 | 30 |
|---|---|---|---|
| KA | 8.1242358E−01 | 8.0000167E−01 | 9.0916971E−01 |
| A3 | 0.0000000E+00 | 0.0000000E+00 | 0.0000000E+00 |
| A4 | −2.3563388E−06 | 9.1562257E−06 | 1.0590240E−06 |
| A5 | 8.2652449E−08 | −4.4677512E−07 | −8.0304351E−08 |
| A6 | −1.3997714E−08 | 4.6123192E−08 | 9.1587796E−09 |
| A7 | 5.8677155E−10 | −2.5071242E−09 | −2.591976GE−10 |
| A8 | 2.7232147E−11 | −1.0417424E−10 | −1.2731607E−11 |
| A9 | −6.9019107E−13 | 4.5997315E−12 | 2.8711636E−13 |
| A10 | −1.2794765E−13 | 4.9257705E−13 | 3.3621405E−14 |

TABLE 3-continued

Example 1

| Surface Number | 13 | 15 | 30 |
|---|---|---|---|
| A11 | 1.3137365E−15 | −1.9366632E−15 | −1.4149166E−16 |
| A12 | 1.0196494E−17 | −1.1232823E−15 | −1.3677371E−17 |
| A13 | 1.5928692E−17 | 8.9245626E−17 | −1.1011129E−18 |
| A14 | 1.9061147E−18 | 1.1702552E−17 | −5.3009011E−20 |
| A15 | −1.6243559E−19 | −2.3875216E−18 | −1.7205137E−21 |
| A16 | −1.7254953E−21 | −5.1680723E−20 | −7.5056863E−23 |
| A17 | −6.9972220E−22 | 1.1874948E−20 | 3.3696942E−23 |
| A18 | 7.9244012E−23 | −3.6819819E−22 | 2.5657854E−25 |
| A19 | 9.6455730E−25 | 3.4253012E−23 | −1.5787720E−25 |
| A20 | −1.5552029E−25 | −1.5379341E−24 | 5.0062251E−27 |

FIG. 9 shows, in order from the left, aberration diagrams of the zoom lens of Example 1 in a state where the object at the infinity is brought into focus. In FIG. 9, in order from the left side, spherical aberration, astigmatism, distortion, and lateral chromatic aberration are shown. In FIG. 9, the upper part labeled by WIDE shows the zoom lens in the wide-angle end state, the middle part labeled by MIDDLE shows the zoom lens in the middle focal length state, the lower part labeled by TELE shows the zoom lens in the telephoto end state. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the gray solid line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

EXAMPLE 2

Figure 3:
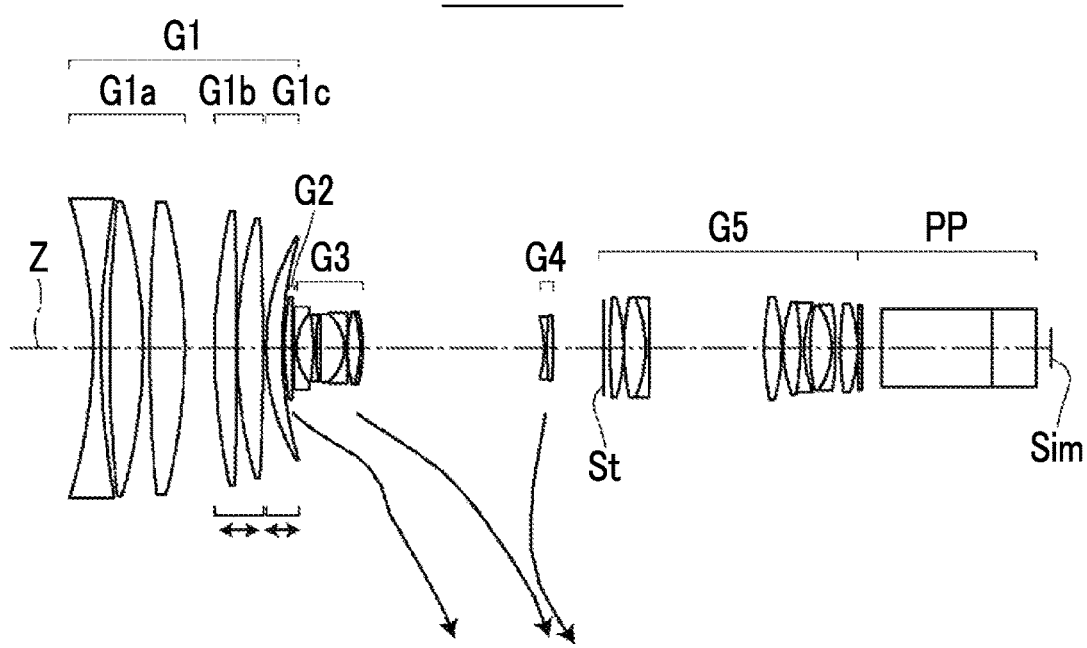
FIG. 3 is a cross-sectional view illustrating a lens configuration and a movement locus of a zoom lens of Example 2 of the present invention at the wide-angle end.

FIG. 3 is a cross-sectional view of a zoom lens of Example 2. The zoom lens of Example 2 has the same configuration as the outline of the zoom lens of Example 1. Table 4 shows basic lens data of the zoom lens of Example 2, Table 5 shows specification and variable surface distances, Table 6 shows aspheric surface coefficients, and FIG. 10 shows aberration diagrams in a state where the object at infinity is in focus.

TABLE 4

Example 2

| Surface Number | R | D | Nd | vd | θgF |
|---|---|---|---|---|---|
| 1 | −144.76696 | 2.500 | 1.80610 | 33.27 | 0.58845 |
| 2 | 253.15530 | 2.500 | | | |
| 3 | 416.68310 | 10.000 | 1.43387 | 95.18 | 0.53733 |
| 4 | −155.21536 | 2.000 | | | |
| 5 | 445.69437 | 10.403 | 1.43387 | 95.18 | 0.53733 |
| 6 | −173.03031 | 9.066 | | | |
| 7 | 188.01580 | 6.500 | 1.43387 | 95.18 | 0.53733 |
| 8 | −1877.22451 | 0.120 | | | |
| 9 | 137.17854 | 7.799 | 1.53775 | 74.70 | 0.53936 |
| 10 | −738.88040 | 0.813 | | | |
| 11 | 66.92745 | 4.625 | 1.72916 | 54.66 | 0.55187 |
| 12 | 113.19551 | DD[12] | | | |
| *13 | 85.12837 | 2.100 | 1.65412 | 39.68 | 0.57378 |
| 14 | 2350.24693 | DD[14] | | | |
| *15 | −1897.90272 | 0.850 | 2.00100 | 29.13 | 0.59952 |
| 16 | 15.62085 | 5.000 | | | |
| 17 | −60.18715 | 0.800 | 2.00100 | 29.13 | 0.59952 |
| 18 | 61.31612 | 1.375 | | | |
| 19 | −785.75533 | 7.000 | 1.89286 | 20.36 | 0.63944 |
| 20 | −13.17831 | 0.810 | 1.89190 | 37.13 | 0.57813 |
| 21 | 231.50915 | 0.120 | | | |
| 22 | 40.82210 | 3.760 | 1.61800 | 63.33 | 0.54414 |
| 23 | −37.86957 | 0.800 | 1.90366 | 31.31 | 0.59481 |
| 24 | −45.48316 | DD[24] | | | |
| 25 | −30.83944 | 0.810 | 1.88300 | 40.76 | 0.56679 |
| 26 | 81.08214 | 2.000 | 1.95906 | 17.47 | 0.65993 |
| 27 | −166.97473 | DD[27] | | | |
| 28(St) | ∞ | 1.823 | | | |
| 29 | 181.72606 | 4.111 | 1.76385 | 48.49 | 0.55898 |
| *30 | −48.88025 | 0.120 | | | |
| 31 | 78.21391 | 6.362 | 1.51633 | 64.14 | 0.53531 |
| 32 | −37.71668 | 1.235 | 1.84850 | 43.79 | 0.56197 |
| 33 | −447.47223 | 34.250 | | | |
| 34 | 79.27767 | 5.127 | 1.58267 | 46.42 | 0.56716 |
| 35 | −54.98298 | 0.500 | | | |
| 36 | 39.72760 | 5.010 | 1.48749 | 70.24 | 0.53007 |
| 37 | −81.51851 | 1.200 | 1.91082 | 35.25 | 0.58224 |
| 38 | 34.02617 | 1.684 | | | |
| 39 | 55.57108 | 6.492 | 1.51633 | 64.14 | 0.53531 |
| 40 | −22.27774 | 1.208 | 1.89190 | 37.13 | 0.57813 |
| 41 | −88.38020 | 1.360 | | | |
| 42 | 117.75429 | 5.012 | 1.51633 | 64.14 | 0.53531 |
| 43 | −37.81623 | 0.200 | | | |
| 44 | ∞ | 1.000 | 1.51633 | 64.14 | 0.53531 |
| 45 | ∞ | 5.778 | | | |
| 46 | ∞ | 33.000 | 1.60859 | 46.44 | 0.56664 |
| 47 | ∞ | 13.200 | 1.51633 | 64.05 | 0.53463 |
| 48 | ∞ | 4.559 | | | |

TABLE 5

Example 2

| | WIDE | MIDDLE | TELE |
|---|---|---|---|
| Zr | 1.0 | 12.6 | 23.1 |
| f | 8.099 | 101.966 | 187.247 |
| FNo. | 1.87 | 2.05 | 2.96 |
| 2ω(°) | 74.6 | 6.2 | 3.4 |
| DD[12] | 0.728 | 48.367 | 53.965 |
| DD[14] | 0.646 | 9.030 | 8.050 |
| DD[24] | 53.844 | 0.857 | 6.986 |
| DD[27] | 14.876 | 11.839 | 1.092 |

TABLE 6

Example 2

| Surface Number | 13 | 15 | 30 |
|---|---|---|---|
| KA | 8.1242358E−01 | 8.0000167E−01 | 9.0916971E−01 |
| A3 | 0.0000000E+00 | 0.0000000E+00 | 0.0000000E+00 |
| A4 | −2.3563388E−06 | 9.1562257E−06 | 1.0590240E−06 |

TABLE 6-continued

Example 2

| Surface Number | 13 | 15 | 30 |
|---|---|---|---|
| A5 | 8.2652449E−08 | −4.4677512E−07 | −8.0304351E−08 |
| A6 | −1.3997714E−08 | 4.6123192E−08 | 9.1587796E−09 |
| A7 | 5.8677155E−10 | −2.5071242E−09 | −2.591976GE−10 |
| A8 | 2.7232147E−11 | −1.0417424E−10 | −1.2731607E−11 |
| A9 | −6.9019107E−13 | 4.5997315E−12 | 2.8711636E−13 |
| A10 | −1.2794765E−13 | 4.9257705E−13 | 3.3621405E−14 |
| A11 | 1.3137365E−15 | −1.9366632E−15 | −1.4149166E−16 |
| A12 | 1.0196494E−17 | −1.1232823E−15 | −1.3677371E−17 |
| A13 | 1.5928692E−17 | 8.9245626E−17 | −1.1011129E−18 |
| A14 | 1.9061147E−18 | 1.1702552E−17 | −5.3009011E−20 |
| A15 | −1.6243559E−19 | −2.3875216E−18 | −1.7205137E−21 |
| A16 | −1.7254953E−21 | −5.1680723E−20 | −7.5056863E−23 |
| A17 | −6.9972220E−22 | 1.1874948E−20 | 3.3696942E−23 |
| A18 | 7.9244012E−23 | −3.6819819E−22 | 2.5657854E−25 |
| A19 | 9.6455730E−25 | 3.4253012E−23 | −1.5787720E−25 |
| A20 | −1.5552029E−25 | −1.5379341E−24 | 5.0062251E−27 |

EXAMPLE 3

Figure 4:
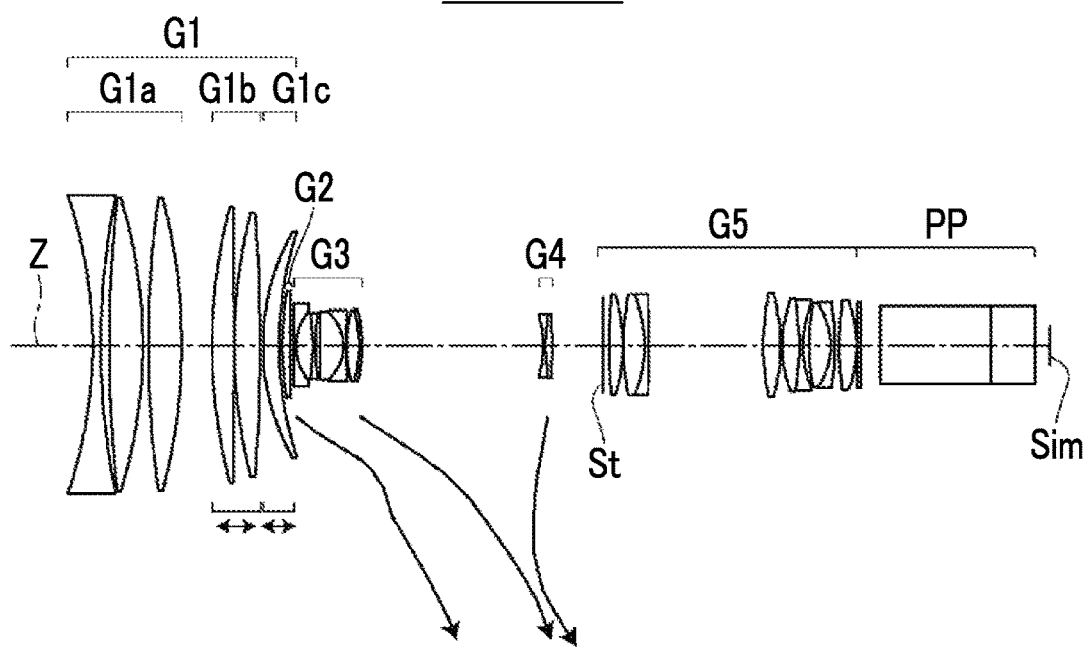
FIG. 4 is a cross-sectional view illustrating a lens configuration and a movement locus of a zoom lens of Example 3 of the present invention at the wide-angle end.

FIG. 4 is a cross-sectional view of a zoom lens of Example 3. The zoom lens of Example 3 has the same configuration as the outline of the zoom lens of Example 1. Table 7 shows basic lens data of the zoom lens of Example 3, Table 8 shows specification and variable surface distances, Table 9 shows aspheric surface coefficients, and FIG. 11 shows aberration diagrams in a state where the object at infinity is in focus.

TABLE 7

Example 3

| Surface Number | R | D | Nd | νd | θgF |
|---|---|---|---|---|---|
| 1 | −136.32422 | 2.500 | 1.80610 | 33.27 | 0.58845 |
| 2 | 221.61732 | 2.500 | | | |
| 3 | 389.91613 | 10.000 | 1.43387 | 95.18 | 0.53733 |
| 4 | −147.88224 | 1.721 | | | |
| 5 | 317.31125 | 9.973 | 1.43387 | 95.18 | 0.53733 |
| 6 | −166.67976 | 9.025 | | | |
| 7 | 159.27890 | 6.500 | 1.43387 | 95.18 | 0.53733 |
| 8 | −4960.87305 | 0.120 | | | |
| 9 | 157.23888 | 7.750 | 1.53775 | 74.70 | 0.53936 |
| 10 | −514.27692 | 0.858 | | | |
| 11 | 69.53715 | 4.625 | 1.81600 | 46.63 | 0.56301 |
| 12 | 108.62352 | DD[12] | | | |
| *13 | 92.89141 | 2.311 | 1.65412 | 39.68 | 0.57378 |
| 14 | −2502.25203 | DD[14] | | | |
| *15 | −2091.98556 | 0.850 | 2.00100 | 29.13 | 0.59952 |
| 16 | 15.61080 | 5.000 | | | |
| 17 | −60.37249 | 0.800 | 2.00100 | 29.13 | 0.59952 |
| 18 | 63.19704 | 1.375 | | | |
| 19 | −916.22786 | 7.000 | 1.89286 | 20.36 | 0.63944 |
| 20 | −13.15788 | 0.810 | 1.89190 | 37.13 | 0.57813 |
| 21 | 217.61015 | 0.120 | | | |
| 22 | 40.72424 | 3.760 | 1.61800 | 63.33 | 0.54414 |
| 23 | −37.50620 | 0.800 | 1.90366 | 31.31 | 0.59481 |
| 24 | −46.02846 | DD[24] | | | |
| 25 | −30.82434 | 0.810 | 1.88300 | 40.76 | 0.56679 |
| 26 | 81.45904 | 2.000 | 1.95906 | 17.47 | 0.65993 |
| 27 | −166.60230 | DD[27] | | | |
| 28 (St) | ∞ | 1.823 | | | |
| 29 | 181.72606 | 4.111 | 1.76385 | 48.49 | 0.55898 |
| *30 | −48.88025 | 0.120 | | | |
| 31 | 78.21391 | 6.362 | 1.51633 | 64.14 | 0.53531 |
| 32 | −37.71668 | 1.235 | 1.84850 | 43.79 | 0.56197 |
| 33 | −447.47223 | 34.250 | | | |
| 34 | 79.27767 | 5.127 | 1.58267 | 46.42 | 0.56716 |
| 35 | −54.98298 | 0.500 | | | |

TABLE 7-continued

Example 3

| Surface Number | R | D | Nd | νd | θgF |
|---|---|---|---|---|---|
| 36 | 39.72760 | 5.010 | 1.48749 | 70.24 | 0.53007 |
| 37 | −81.51851 | 1.200 | 1.91082 | 35.25 | 0.58224 |
| 38 | 34.02617 | 1.684 | | | |
| 39 | 55.57108 | 6.492 | 1.51633 | 64.14 | 0.53531 |
| 40 | −22.27774 | 1.208 | 1.89190 | 37.13 | 0.57813 |
| 41 | −88.38020 | 1.360 | | | |
| 42 | 117.75429 | 5.012 | 1.51633 | 64.14 | 0.53531 |
| 43 | −37.81623 | 0.200 | | | |
| 44 | ∞ | 1.000 | 1.51633 | 64.14 | 0.53531 |
| 45 | ∞ | 5.778 | | | |
| 46 | ∞ | 33.000 | 1.60859 | 46.44 | 0.56664 |
| 47 | ∞ | 13.200 | 1.51633 | 64.05 | 0.53463 |
| 48 | ∞ | 4.558 | | | |

TABLE 8

Example 3

| | WIDE | MIDDLE | TELE |
|---|---|---|---|
| Zr | 1.0 | 12.6 | 23.1 |
| f | 8.114 | 102.161 | 187.607 |
| FNo. | 1.87 | 2.04 | 2.96 |
| 2ω (°) | 74.6 | 6.2 | 3.4 |
| DD[12] | 1.007 | 48.298 | 53.995 |
| DD[14] | 0.864 | 9.412 | 8.361 |
| DD[24] | 53.819 | 0.980 | 7.058 |
| DD[27] | 14.920 | 11.918 | 1.194 |

TABLE 9

Example 3

| | Surface Number | | |
|---|---|---|---|
| | 13 | 15 | 30 |
| KA | 8.1242358E−01 | 8.0000167E−01 | 9.0916971E−01 |
| A3 | 0.0000000E+00 | 0.0000000E+00 | 0.0000000E+00 |
| A4 | −2.3563388E−06 | 9.1562257E−06 | 1.0590240E−06 |
| A5 | 8.2652449E−08 | −4.4677512E−07 | −8.0304351E−08 |
| A6 | −1.3997714E−08 | 4.6123192E−08 | 9.1587796E−09 |
| A7 | 5.8677155E−10 | −2.5071242E−09 | −2.591976GE−10 |
| A8 | 2.7232147E−11 | −1.0417424E−10 | −1.2731607E−11 |
| A9 | −6.9019107E−13 | 4.5997315E−12 | 2.8711636E−13 |
| A10 | −1.2794765E−13 | 4.9257705E−13 | 3.3621405E−14 |
| A11 | 1.3137365E−15 | −1.9366632E−15 | −1.4149166E−16 |
| A12 | 1.0196494E−17 | −1.1232823E−15 | −1.3677371E−17 |
| A13 | 1.5928692E−17 | 8.9245626E−17 | −1.1011129E−18 |
| A14 | 1.9061147E−18 | 1.1702552E−17 | −5.3009011E−20 |
| A15 | −1.6243559E−19 | −2.3875216E−18 | −1.7205137E−21 |
| A16 | −1.7254953E−21 | −5.1680723E−20 | −7.5056863E−23 |
| A17 | −6.9972220E−22 | 1.1874948E−20 | 3.3696942E−23 |
| A18 | 7.9244012E−23 | −3.6819819E−22 | 2.5657854E−25 |
| A19 | 9.6455730E−25 | 3.4253012E−23 | −1.5787720E−25 |
| A20 | −1.5552029E−25 | −1.5379341E−24 | 5.0062251E−27 |

EXAMPLE 4

Figure 5:
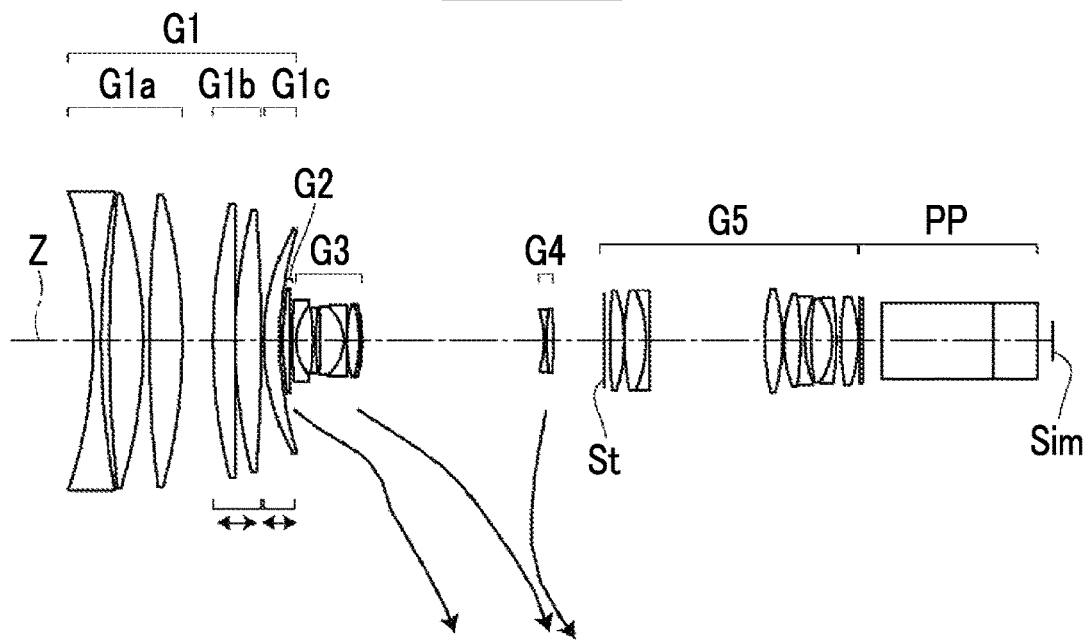
FIG. 5 is a cross-sectional view illustrating a lens configuration and a movement locus of a zoom lens of Example 4 of the present invention at the wide-angle end.

FIG. 5 is a cross-sectional view of a zoom lens of Example 4. The zoom lens of Example 4 has the same configuration as the outline of the zoom lens of Example 1. Table 10 shows basic lens data of the zoom lens of Example 4, Table 11 shows specification and variable surface distances, Table 12 shows aspheric surface coefficients, and FIG. 12 shows aberration diagrams in a state where the object at infinity is in focus.

TABLE 10

Example 4

| Surface Number | R | D | Nd | vd | θgF |
|---|---|---|---|---|---|
| 1 | −136.70840 | 2.431 | 1.80610 | 33.27 | 0.58845 |
| 2 | 239.28146 | 2.500 | | | |
| 3 | 416.68310 | 10.000 | 1.43387 | 95.18 | 0.53733 |
| 4 | −147.36490 | 1.841 | | | |
| 5 | 370.31522 | 9.888 | 1.43387 | 95.18 | 0.53733 |
| 6 | −162.83507 | 9.042 | | | |
| 7 | 164.10685 | 6.500 | 1.43387 | 95.18 | 0.53733 |
| 8 | 6908.82651 | 0.120 | | | |
| 9 | 152.35678 | 7.750 | 1.53775 | 74.70 | 0.53936 |
| 10 | −551.18944 | 0.796 | | | |
| 11 | 69.19153 | 4.625 | 1.79913 | 49.75 | 0.55952 |
| 12 | 112.14526 | DD[12] | | | |
| *13 | 87.65244 | 2.241 | 1.65412 | 39.68 | 0.57378 |
| 14 | 6605.07068 | DD[14] | | | |
| *15 | −4002.56207 | 0.850 | 2.00100 | 29.13 | 0.59952 |
| 16 | 15.55077 | 5.000 | | | |
| 17 | −60.06901 | 0.800 | 2.00100 | 29.13 | 0.59952 |
| 18 | 62.27793 | 1.375 | | | |
| 19 | −717.82367 | 7.000 | 1.89286 | 20.36 | 0.63944 |
| 20 | −13.17248 | 0.810 | 1.89190 | 37.13 | 0.57813 |
| 21 | 234.15096 | 0.120 | | | |
| 22 | 40.77795 | 3.760 | 1.61800 | 63.33 | 0.54414 |
| 23 | −37.47828 | 0.800 | 1.90366 | 31.31 | 0.59481 |
| 24 | −45.60294 | DD[24] | | | |
| 25 | −30.78331 | 0.810 | 1.88300 | 40.76 | 0.56679 |
| 26 | 80.52329 | 2.000 | 1.95906 | 17.47 | 0.65993 |
| 27 | −167.59743 | DD[27] | | | |
| 28 (St) | ∞ | 1.823 | | | |
| 29 | 181.72606 | 4.111 | 1.76385 | 48.49 | 0.55898 |
| *30 | −48.88025 | 0.120 | | | |
| 31 | 78.21391 | 6.362 | 1.51633 | 64.14 | 0.53531 |
| 32 | −37.71668 | 1.235 | 1.84850 | 43.79 | 0.56197 |
| 33 | −447.47223 | 34.250 | | | |
| 34 | 79.27767 | 5.127 | 1.58267 | 46.42 | 0.56716 |
| 35 | −54.98298 | 0.500 | | | |
| 36 | 39.72760 | 5.010 | 1.48749 | 70.24 | 0.53007 |
| 37 | −81.51851 | 1.200 | 1.91082 | 35.25 | 0.58224 |
| 38 | 34.02617 | 1.684 | | | |
| 39 | 55.57108 | 6.492 | 1.51633 | 64.14 | 0.53531 |
| 40 | −22.27774 | 1.208 | 1.89190 | 37.13 | 0.57813 |
| 41 | −88.38020 | 1.360 | | | |
| 42 | 117.75429 | 5.012 | 1.51633 | 64.14 | 0.53531 |
| 43 | −37.81623 | 0.200 | | | |
| 44 | ∞ | 1.000 | 1.51633 | 64.14 | 0.53531 |
| 45 | ∞ | 5.778 | | | |
| 46 | ∞ | 33.000 | 1.60859 | 46.44 | 0.56664 |
| 47 | ∞ | 13.200 | 1.51633 | 64.05 | 0.53463 |
| 48 | ∞ | 4.558 | | | |

TABLE 11

Example 4

| | WIDE | MIDDLE | TELE |
|---|---|---|---|
| Zr | 1.0 | 12.6 | 23.1 |
| f | 8.104 | 102.030 | 187.366 |
| FNo. | 1.87 | 2.05 | 2.96 |
| 2ω (°) | 74.6 | 6.2 | 3.4 |
| DD[12] | 0.880 | 48.441 | 54.111 |
| DD[14] | 0.803 | 9.178 | 8.143 |
| DD[24] | 53.810 | 0.929 | 7.006 |
| DD[27] | 14.957 | 11.901 | 1.189 |

TABLE 12

Example 4

| | Surface Number | | |
|---|---|---|---|
| | 13 | 15 | 30 |
| KA | 8.1242358E−01 | 8.0000167E−01 | 9.0916971E−01 |
| A3 | 0.0000000E+00 | 0.0000000E+00 | 0.0000000E+00 |
| A4 | −2.3563388E−06 | 9.1562257E−06 | 1.0590240E−06 |
| A5 | 8.2652449E−08 | −4.4677512E−07 | −8.0304351E−08 |
| A6 | −1.3997714E−08 | 4.6123192E−08 | 9.1587796E−09 |
| A7 | 5.8677155E−10 | −2.5071242E−09 | −2.591976GE−10 |
| A8 | 2.7232147E−11 | −1.0417424E−10 | −1.2731607E−11 |
| A9 | −6.9019107E−13 | 4.5997315E−12 | 2.8711636E−13 |
| A10 | −1.2794765E−13 | 4.9257705E−13 | 3.3621405E−14 |
| A11 | 1.3137365E−15 | −1.9366632E−15 | −1.4149166E−16 |
| A12 | 1.0196494E−17 | −1.1232823E−15 | −1.3677371E−17 |
| A13 | 1.5928692E−17 | 8.9245626E−17 | −1.1011129E−18 |
| A14 | 1.9061147E−18 | 1.1702552E−17 | −5.3009011E−20 |
| A15 | −1.6243559E−19 | −2.3875216E−18 | −1.7205137E−21 |
| A16 | −1.7254953E−21 | −5.1680723E−20 | −7.5056863E−23 |
| A17 | −6.9972220E−22 | 1.1874948E−20 | 3.3696942E−23 |
| A18 | 7.9244012E−23 | −3.6819819E−22 | 2.5657854E−25 |
| A19 | 9.6455730E−25 | 3.4253012E−23 | −1.5787720E−25 |
| A20 | −1.5552029E−25 | −1.5379341E−24 | 5.0062251E−27 |

EXAMPLE 5

Figure 6:
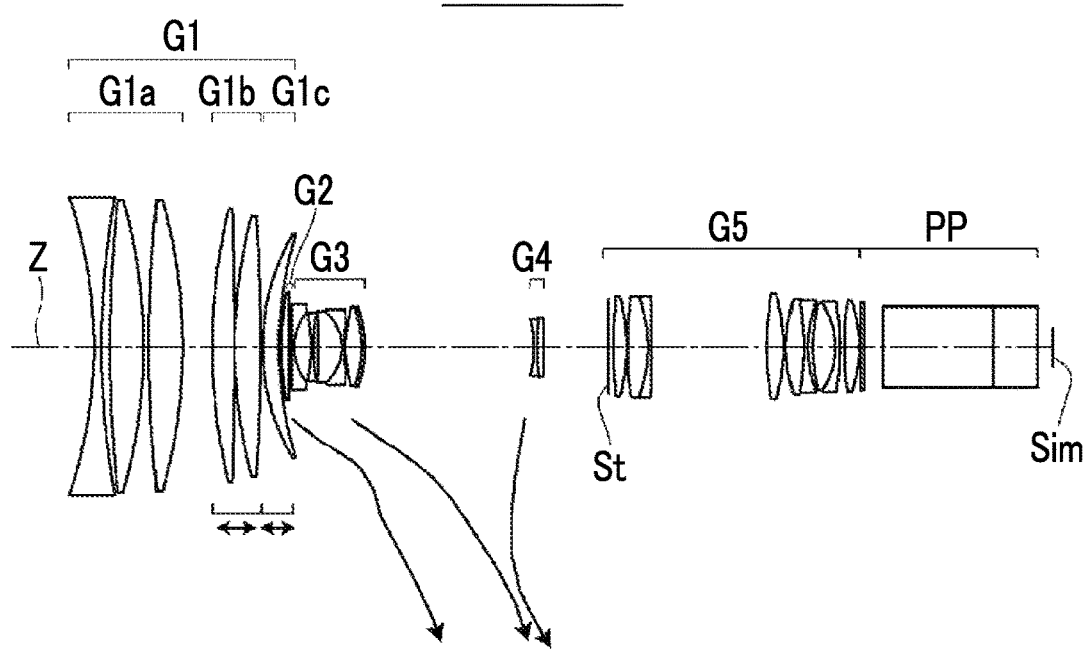
FIG. 6 is a cross-sectional view illustrating a lens configuration and a movement locus of a zoom lens of Example 5 of the present invention at the wide-angle end.

FIG. 6 is a cross-sectional view of a zoom lens of Example 5. The zoom lens of Example 5 has the same configuration as the outline of the zoom lens of Example 1. Table 13 shows basic lens data of the zoom lens of Example 5, Table 14 shows specification and variable surface distances, Table 15 shows aspheric surface coefficients, and FIG. 13 shows aberration diagrams in a state where the object at infinity is in focus.

TABLE 13

Example 5

| Surface Number | R | D | Nd | vd | θgF |
|---|---|---|---|---|---|
| 1 | −137.52951 | 2.375 | 1.80610 | 33.27 | 0.58845 |
| 2 | 251.29815 | 2.500 | | | |
| 3 | 413.88690 | 10.000 | 1.43387 | 95.18 | 0.53733 |
| 4 | −157.18891 | 1.537 | | | |
| 5 | 399.48117 | 9.897 | 1.43387 | 95.18 | 0.53733 |
| 6 | −157.33456 | 8.922 | | | |
| 7 | 173.19494 | 6.500 | 1.43387 | 95.18 | 0.53733 |
| 8 | −1747.86479 | 0.120 | | | |
| 9 | 148.54602 | 7.750 | 1.49700 | 81.54 | 0.53748 |
| 10 | −595.85862 | 0.705 | | | |
| 11 | 67.66036 | 4.752 | 1.76385 | 48.49 | 0.55898 |
| 12 | 115.09586 | DD[12] | | | |
| *13 | 85.88907 | 2.314 | 1.65412 | 39.68 | 0.57378 |
| 14 | ∞ | DD[14] | | | |
| *15 | −843.64448 | 0.850 | 2.00100 | 29.13 | 0.59952 |
| 16 | 15.95503 | 5.026 | | | |
| 17 | −55.74656 | 0.800 | 2.00100 | 29.13 | 0.59952 |
| 18 | 69.93146 | 1.385 | | | |
| 19 | −194.33920 | 7.096 | 1.89286 | 20.36 | 0.63944 |
| 20 | −13.99973 | 0.874 | 1.89190 | 37.13 | 0.57813 |
| 21 | 233.98754 | 0.223 | | | |
| 22 | 43.23320 | 4.780 | 1.61800 | 63.33 | 0.54414 |
| 23 | −34.73415 | 0.971 | 1.90366 | 31.31 | 0.59481 |
| 24 | −34.93381 | DD[24] | | | |
| 25 | −28.56493 | 0.810 | 1.88300 | 40.76 | 0.56679 |
| 26 | 70.89085 | 2.000 | 1.95906 | 17.47 | 0.65993 |
| 27 | −163.00384 | DD[27] | | | |
| 28 (St) | ∞ | 1.516 | | | |
| 29 | 173.12899 | 3.927 | 1.76385 | 48.49 | 0.55898 |
| *30 | −52.67462 | 0.123 | | | |
| 31 | 95.45161 | 6.261 | 1.51633 | 64.14 | 0.53531 |

TABLE 13-continued

Example 5

| Surface Number | R | D | Nd | vd | θgF |
|---|---|---|---|---|---|
| 32 | −40.16818 | 1.200 | 1.84850 | 43.79 | 0.56197 |
| 33 | −338.97528 | 34.260 | | | |
| 34 | 88.60524 | 5.058 | 1.58267 | 46.42 | 0.56716 |
| 35 | −54.73030 | 0.614 | | | |
| 36 | 42.17298 | 5.171 | 1.48749 | 70.24 | 0.53007 |
| 37 | −76.49827 | 1.210 | 1.91082 | 35.25 | 0.58224 |
| 38 | 35.76959 | 1.589 | | | |
| 39 | 56.44433 | 6.692 | 1.51633 | 64.14 | 0.53531 |
| 40 | −22.30483 | 1.200 | 1.89190 | 37.13 | 0.57813 |
| 41 | −83.22073 | 1.205 | | | |
| 42 | 105.38657 | 4.580 | 1.51633 | 64.14 | 0.53531 |
| 43 | −38.15009 | 0.200 | | | |
| 44 | ∞ | 1.000 | 1.51633 | 64.14 | 0.53531 |
| 45 | ∞ | 5.778 | | | |
| 46 | ∞ | 33.000 | 1.60859 | 46.44 | 0.56664 |
| 47 | ∞ | 13.200 | 1.51633 | 64.05 | 0.53463 |
| 48 | ∞ | 4.590 | | | |

TABLE 14

Example 5

| | WIDE | MIDDLE | TELE |
|---|---|---|---|
| Zr | 1.0 | 12.6 | 23.1 |
| f | 8.160 | 102.733 | 188.656 |
| FNo. | 1.87 | 2.28 | 2.97 |
| 2ω (°) | 74.4 | 6.2 | 3.4 |
| DD[12] | 0.657 | 49.318 | 55.085 |
| DD[14] | 0.563 | 8.385 | 7.019 |
| DD[24] | 50.686 | 1.217 | 8.034 |
| DD[27] | 19.224 | 12.211 | 0.993 |

TABLE 15

Example 5

| | Surface Number | | |
|---|---|---|---|
| | 13 | 15 | 30 |
| KA | 1.2000001E+00 | 7.9999856E−01 | 1.1970675E+00 |
| A3 | 0.0000000E+00 | 0.0000000E+00 | 0.0000000E+00 |
| A4 | −9.5552384E−07 | 4.8192625E−06 | 1.2960155E−06 |
| A5 | −2.6845852E−07 | 2.1463167E−07 | −2.8442538E−08 |
| A6 | 1.6642204E−08 | −1.5235795E−08 | 3.2446054E−09 |
| A7 | 3.7856429E−11 | −1.3987315E−09 | −2.5375144E−11 |
| A8 | −7.9159980E−12 | 2.1543265E−11 | −4.8818495E−12 |
| A9 | −1.7454568E−12 | 7.9462631E−12 | −8.2100210E−14 |
| A10 | 4.7873881E−14 | 3.3945583E−13 | −7.8036255E−16 |
| A11 | −1.7639440E−15 | −5.2095092E−14 | 2.2903133E−16 |
| A12 | −4.4312877E−16 | −3.1263755E−16 | 1.9634109E−17 |
| A13 | 2.0795716E−17 | −1.3296622E−16 | 9.9975057E−19 |
| A14 | 6.1248859E−18 | 3.3418802E−18 | 8.9339074E−20 |
| A15 | −4.6767275E−19 | 6.9986277E−19 | 1.5565100E−21 |
| A16 | 6.7211673E−21 | −1.2546087E−20 | 1.2160918E−22 |
| A17 | 7.2057144E−22 | 6.0274240E−21 | −6.0140872E−23 |
| A18 | −3.4885178E−23 | −4.7569503E−22 | 1.2779251E−25 |
| A19 | 7.3551234E−25 | 2.9036571E−23 | −3.3150460E−26 |
| A20 | −5.1964691E−26 | −1.5380353E−24 | 5.4623992E−27 |

EXAMPLE 6

Figure 7:
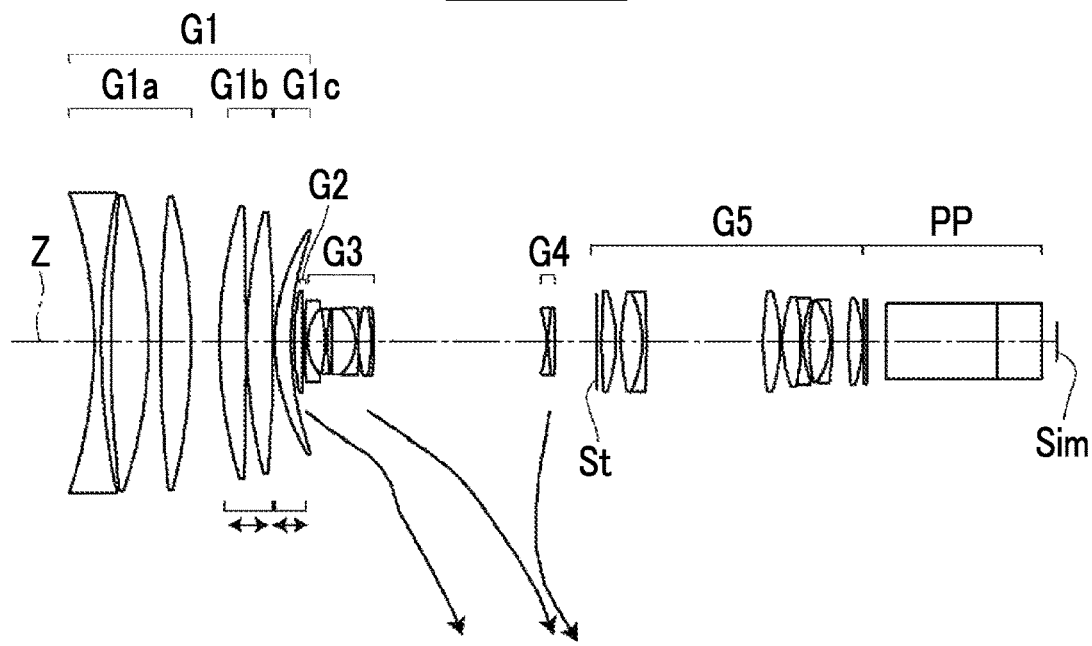
FIG. 7 is a cross-sectional view illustrating a lens configuration and a movement locus of a zoom lens of Example 6 of the present invention at the wide-angle end.

FIG. 7 is a cross-sectional view of a zoom lens of Example 6. The zoom lens of Example 6 has the same configuration as the outline of the zoom lens of Example 1. Table 16 shows basic lens data of the zoom lens of Example 6, Table 17 shows specification and variable surface distances, Table 18 shows aspheric surface coefficients, and FIG. 14 shows aberration diagrams in a state where the object at infinity is in focus.

TABLE 16

Example 6

| Surface Number | R | D | Nd | vd | θgF |
|---|---|---|---|---|---|
| 1 | −135.77436 | 2.000 | 1.80610 | 33.27 | 0.58845 |
| 2 | 205.74615 | 3.000 | | | |
| 3 | 379.47809 | 11.160 | 1.43387 | 95.18 | 0.53733 |
| 4 | −131.37026 | 3.250 | | | |
| 5 | 400.76344 | 9.068 | 1.43387 | 95.18 | 0.53733 |
| 6 | −174.44870 | 8.438 | | | |
| 7 | 137.14615 | 8.000 | 1.43387 | 95.18 | 0.53733 |
| 8 | −1033.88036 | 0.120 | | | |
| 9 | 150.65419 | 7.750 | 1.55032 | 75.50 | 0.54001 |
| 10 | −530.25276 | 0.589 | | | |
| 11 | 61.46305 | 4.641 | 1.76385 | 48.49 | 0.55898 |
| 12 | 93.85870 | DD[12] | | | |
| *13 | 70.16218 | 2.621 | 1.53996 | 59.46 | 0.54418 |
| 14 | −25227.04339 | DD[14] | | | |
| *15 | 247.20384 | 0.850 | 2.00100 | 29.13 | 0.59952 |
| 16 | 15.28487 | 5.000 | | | |
| 17 | −43.05644 | 0.800 | 1.91650 | 31.60 | 0.59117 |
| 18 | 57.15188 | 1.375 | | | |
| 19 | −587.67113 | 7.000 | 1.89286 | 20.36 | 0.63944 |
| 20 | −13.15783 | 0.810 | 1.89190 | 37.13 | 0.57813 |
| 21 | −356.36069 | 0.120 | | | |
| 22 | 40.37086 | 3.760 | 1.57135 | 52.95 | 0.55544 |
| 23 | −46.49734 | 0.800 | 1.84850 | 43.79 | 0.56197 |
| 24 | −86.77868 | DD[24] | | | |
| 25 | −30.92061 | 0.785 | 1.90525 | 35.04 | 0.58486 |
| 26 | 62.53102 | 2.000 | 1.95906 | 17.47 | 0.65993 |
| 27 | −163.66892 | DD[27] | | | |
| 28 (St) | ∞ | 1.500 | | | |
| 29 | 217.27997 | 4.238 | 1.76385 | 48.49 | 0.55898 |
| *30 | −44.04120 | 1.598 | | | |
| 31 | 64.58901 | 6.260 | 1.51633 | 64.14 | 0.53531 |
| 32 | −35.44789 | 1.200 | 1.84850 | 43.79 | 0.56197 |
| 33 | −437.19996 | 34.745 | | | |
| 34 | 91.87208 | 5.000 | 1.57099 | 50.80 | 0.55887 |
| 35 | −50.56901 | 0.830 | | | |
| 36 | 37.34478 | 5.010 | 1.48749 | 70.24 | 0.53007 |
| 37 | −70.31690 | 0.800 | 1.89190 | 37.13 | 0.57813 |
| 38 | 33.63247 | 1.839 | | | |
| 39 | 67.33401 | 5.947 | 1.51633 | 64.14 | 0.53531 |
| 40 | −21.17413 | 0.800 | 1.83400 | 37.21 | 0.58082 |
| 41 | −80.48162 | 4.637 | | | |
| 42 | 130.65948 | 4.186 | 1.51633 | 64.14 | 0.53531 |
| 43 | −37.56211 | 0.200 | | | |
| 44 | ∞ | 1.000 | 1.51633 | 64.14 | 0.53531 |
| 45 | ∞ | 5.778 | | | |
| 46 | ∞ | 33.000 | 1.60859 | 46.44 | 0.56664 |
| 47 | ∞ | 13.200 | 1.51633 | 64.05 | 0.53463 |
| 48 | ∞ | 4.553 | | | |

TABLE 17

Example 6

| | WIDE | MIDDLE | TELE |
|---|---|---|---|
| Zr | 1.0 | 12.6 | 23.1 |
| f | 8.088 | 101.822 | 186.983 |
| FNo. | 1.87 | 1.94 | 2.96 |
| 2ω (°) | 74.8 | 6.2 | 3.4 |
| DD[12] | 0.963 | 44.816 | 49.512 |
| DD[14] | 0.549 | 7.025 | 6.349 |
| DD[24] | 51.067 | 1.915 | 7.628 |
| DD[27] | 12.027 | 10.850 | 1.118 |

TABLE 18

Example 6

| | Surface Number | | |
|---|---|---|---|
| | 13 | 15 | 30 |
| KA | 8.9759071E−01 | 9.0472558E−01 | 1.0017285E+00 |
| A3 | 0.0000000E+00 | 0.0000000E+00 | 0.0000000E+00 |
| A4 | −2.8175867E−06 | 6.7870891E−06 | 1.0046015E−06 |
| A5 | −4.8487975E−08 | −2.4362617E−07 | −1.7120053E−08 |
| A6 | 3.0889073E−09 | −3.4386841E−09 | 5.6539837E−10 |
| A7 | 2.0801222E−11 | −3.3227596E−10 | 5.7823180E−11 |
| A8 | −2.2110179E−12 | 1.7041488E−11 | −1.3611764E−12 |
| A9 | −1.0371658E−13 | 2.5546848E−12 | −7.6347437E−14 |
| A10 | −3.4620946E−15 | 8.5365067E−14 | −1.0812178E−15 |
| A11 | 3.3341856E−16 | −5.8678798E−15 | 1.1327507E−17 |
| A12 | −7.0060983E−17 | −7.9711464E−16 | 3.9246265E−18 |
| A13 | −7.7664213E−19 | −6.9871746E−17 | 1.3353219E−19 |
| A14 | −1.0823228E−19 | 2.4661960E−18 | 4.4493894E−21 |
| A15 | 2.2451340E−21 | −1.1139937E−19 | −1.9544988E−22 |
| A16 | 2.5700471E−21 | 2.2045464E−20 | −7.2837545E−23 |
| A17 | −5.2432609E−23 | 1.6250948E−21 | 6.7697950E−24 |
| A18 | 4.8633976E−24 | −2.5671282E−22 | −8.2608742E−25 |
| A19 | 3.7452830E−25 | 5.4652291E−24 | 5.7651866E−26 |
| A20 | −4.9072349E−26 | 2.4361491E−25 | −9.7983384E−28 |

EXAMPLE 7

Figure 8:
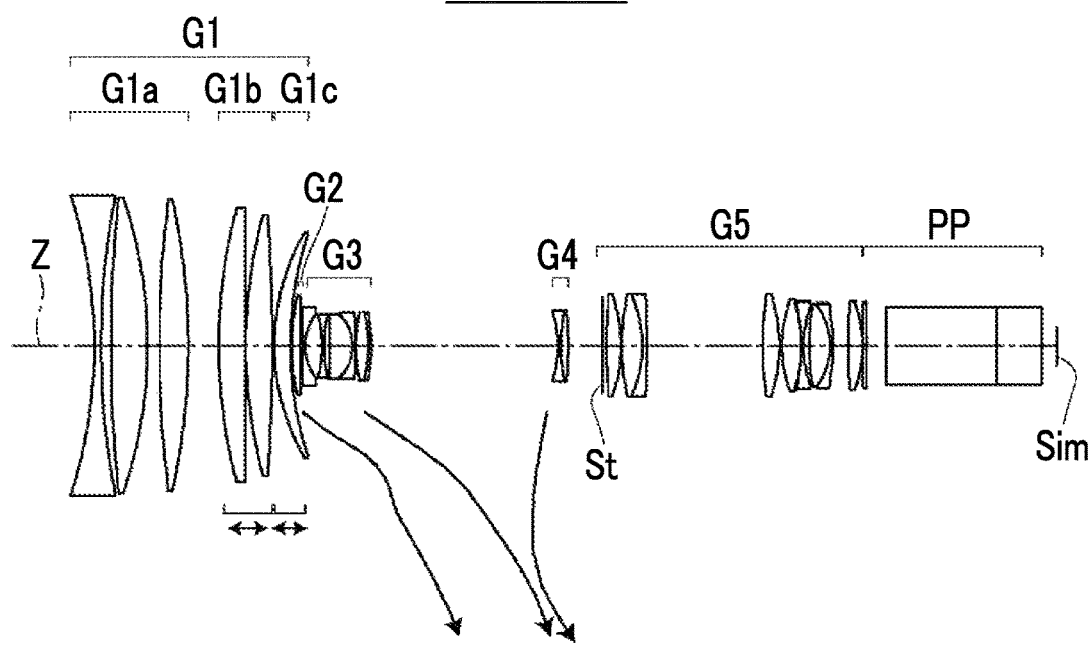
FIG. 8 is a cross-sectional view illustrating a lens configuration and a movement locus of a zoom lens of Example 7 of the present invention at the wide-angle end.

FIG. 8 is a cross-sectional view of a zoom lens of Example 7. The zoom lens of Example 7 has the same configuration as the outline of the zoom lens of Example 1. Table 19 shows basic lens data of the zoom lens of Example 7, Table 20 shows specification and variable surface distances, Table 21 shows aspheric surface coefficients, and FIG. 15 shows aberration diagrams in a state where the object at infinity is in focus.

TABLE 19

Example 7

| Surface Number | R | D | Nd | vd | θgF |
|---|---|---|---|---|---|
| 1 | −142.94074 | 2.000 | 1.80610 | 33.27 | 0.58845 |
| 2 | 225.87936 | 3.000 | | | |
| 3 | 416.72918 | 10.913 | 1.43387 | 95.18 | 0.53733 |
| 4 | −133.45497 | 3.169 | | | |
| 5 | 339.76896 | 8.592 | 1.43387 | 95.18 | 0.53733 |
| 6 | −201.42386 | 9.169 | | | |
| 7 | 155.09101 | 8.000 | 1.43387 | 95.18 | 0.53733 |
| 8 | −5180.26576 | 0.120 | | | |
| 9 | 147.53075 | 7.750 | 1.55032 | 75.50 | 0.54001 |
| 10 | −605.76353 | 0.665 | | | |
| 11 | 66.44838 | 4.625 | 1.76385 | 48.49 | 0.55898 |
| 12 | 103.62550 | DD[12] | | | |
| *13 | 54.34040 | 2.810 | 1.53996 | 59.46 | 0.54418 |
| 14 | −25213.94112 | DD[14] | | | |
| *15 | 695.71528 | 0.850 | 2.00100 | 29.13 | 0.59952 |
| 16 | 15.26435 | 5.000 | | | |
| 17 | −40.76580 | 0.800 | 1.91650 | 31.60 | 0.59117 |
| 18 | 51.68040 | 1.375 | | | |
| 19 | −424.91757 | 7.000 | 1.89286 | 20.36 | 0.63944 |
| 20 | −13.19305 | 0.810 | 1.89190 | 37.13 | 0.57813 |
| 21 | −410.25599 | 0.120 | | | |
| 22 | 42.45258 | 3.760 | 1.57135 | 52.95 | 0.55544 |
| 23 | −42.62005 | 0.800 | 1.84850 | 43.79 | 0.56197 |
| 24 | −59.77549 | DD[24] | | | |
| 25 | −31.32233 | 0.785 | 1.90525 | 35.04 | 0.58486 |
| 26 | 65.15042 | 2.000 | 1.95906 | 17.47 | 0.65993 |
| 27 | −152.43376 | DD[27] | | | |
| 28 (St) | ∞ | 1.500 | | | |
| 29 | 255.13296 | 4.218 | 1.76385 | 48.49 | 0.55898 |
| *30 | −43.09868 | 0.120 | | | |
| 31 | 61.76549 | 6.260 | 1.51633 | 64.14 | 0.53531 |
| 32 | −34.97566 | 1.200 | 1.84850 | 43.79 | 0.56197 |
| 33 | −429.81818 | 34.625 | | | |
| 34 | 98.80951 | 5.000 | 1.57099 | 50.80 | 0.55887 |
| 35 | −48.16741 | 0.738 | | | |
| 36 | 37.43975 | 5.376 | 1.48749 | 70.24 | 0.53007 |
| 37 | −58.56286 | 0.800 | 1.89190 | 37.13 | 0.57813 |
| 38 | 34.98199 | 1.748 | | | |
| 39 | 76.25153 | 6.133 | 1.51633 | 64.14 | 0.53531 |
| 40 | −20.50916 | 0.800 | 1.83400 | 37.21 | 0.58082 |
| 41 | −74.56292 | 4.383 | | | |
| 42 | 137.83478 | 4.409 | 1.51633 | 64.14 | 0.53531 |
| 43 | −36.05391 | 0.200 | | | |
| 44 | ∞ | 1.000 | 1.51633 | 64.14 | 0.53531 |
| 45 | ∞ | 5.778 | | | |
| 46 | ∞ | 33.000 | 1.60859 | 46.44 | 0.56664 |
| 47 | ∞ | 13.200 | 1.51633 | 64.05 | 0.53463 |
| 48 | ∞ | 4.696 | | | |

TABLE 20

Example 7

| | WIDE | MIDDLE | TELE |
|---|---|---|---|
| Zr | 1.0 | 12.6 | 23.1 |
| f | 8.101 | 101.986 | 187.285 |
| FNo. | 1.87 | 1.88 | 2.96 |
| 2ω (°) | 74.6 | 6.2 | 3.4 |
| DD[12] | 0.312 | 47.805 | 53.130 |
| DD[14] | 0.404 | 7.341 | 6.725 |
| DD[24] | 55.762 | 1.541 | 6.280 |
| DD[27] | 10.141 | 9.932 | 0.484 |

TABLE 21

Example 7

| | Surface Number | | |
|---|---|---|---|
| | 13 | 15 | 30 |
| KA | 1.0214218E+00 | 1.2000144E+00 | 9.6312117E−01 |
| A3 | 0.0000000E+00 | 0.0000000E+00 | 0.0000000E+00 |
| A4 | −2.9833793E−06 | 9.6211658E−06 | 7.9541933E−07 |
| A5 | −6.7442489E−08 | −2.5037743E−07 | −5.8088416E−09 |
| A6 | 2.1090643E−09 | −6.4836020E−09 | −8.0706587E−10 |
| A7 | 3.1791583E−11 | −3.7791140E−10 | 1.0052674E−10 |
| A8 | −9.6258785E−13 | 1.9696520E−11 | −1.0008348E−12 |
| A9 | −2.8885881E−14 | 2.1555470E−12 | −1.1099152E−13 |
| A10 | −1.0497818E−14 | 2.7697571E−14 | 5.5801370E−16 |
| A11 | −8.2016972E−18 | −1.1451844E−14 | 3.0168631E−18 |
| A12 | −7.1712084E−17 | −6.1469461E−16 | 1.9103486E−18 |
| A13 | 8.8384808E−19 | −4.5064375E−17 | 6.9551257E−20 |
| A14 | 8.9656089E−20 | 3.3746750E−18 | −4.6971275E−21 |
| A15 | −4.8337589E−20 | −7.2212346E−20 | −6.8346595E−23 |
| A16 | 5.8632033E−21 | 3.4453709E−20 | −1.2343289E−22 |
| A17 | 7.0480705E−23 | 1.0845204E−21 | 8.6913973E−24 |
| A18 | 5.9170039E−25 | −2.8759702E−22 | −5.1729026E−25 |
| A19 | −1.6659233E−25 | 4.0658695E−24 | 7.1323992E−26 |
| A20 | −5.2735367E−26 | 3.7474070E−25 | −2.3493981E−27 |

Table 22 shows values corresponding to Conditional Expressions (1) to (9) of the zoom lenses of Examples 1 to 7. In Examples 1 to 7, the d line is set as the reference wavelength. Table 22 shows the values on the d line basis.

TABLE 22

| Expression Number | | Example 1 | Example 2 | Example 3 | Example 4 | Example 5 | Example 6 | Example 7 |
|---|---|---|---|---|---|---|---|---|
| (1) | f1/f3 | −4.86 | −4.87 | −4.90 | −4.88 | −4.11 | −5.24 | −5.67 |
| (2) | N1p | 1.764 | 1.729 | 1.816 | 1.799 | 1.764 | 1.764 | 1.764 |
| (3) | ν1p | 48.49 | 54.66 | 46.63 | 49.75 | 48.49 | 48.49 | 48.49 |
| (4) | θgF1p + 0.001625 × ν1p | 0.638 | 0.641 | 0.639 | 0.640 | 0.638 | 0.638 | 0.638 |
| (5) | f1/f2 | 0.59 | 0.60 | 0.59 | 0.60 | 0.62 | 0.57 | 0.79 |
| (6) | f3a/f3 | 0.55 | 0.55 | 0.56 | 0.56 | 0.48 | 0.64 | 0.60 |
| (7) | N2p | 1.538 | 1.538 | 1.538 | 1.538 | 1.497 | 1.550 | 1.550 |
| (8) | ν2p | 74.70 | 74.70 | 74.70 | 74.70 | 81.54 | 75.50 | 75.50 |
| (9) | θgF2p + 0.001625 × ν2p | 0.661 | 0.661 | 0.661 | 0.661 | 0.670 | 0.663 | 0.663 |

As can be seen from the above data, in the zoom lens of Examples 1 to 7, reduction in size and weight is achieved, the high zoom ratio is ensured such that the zoom ratio is 23 or more, and various aberrations are satisfactorily corrected, whereby high optical performance is achieved.

Figure 16:
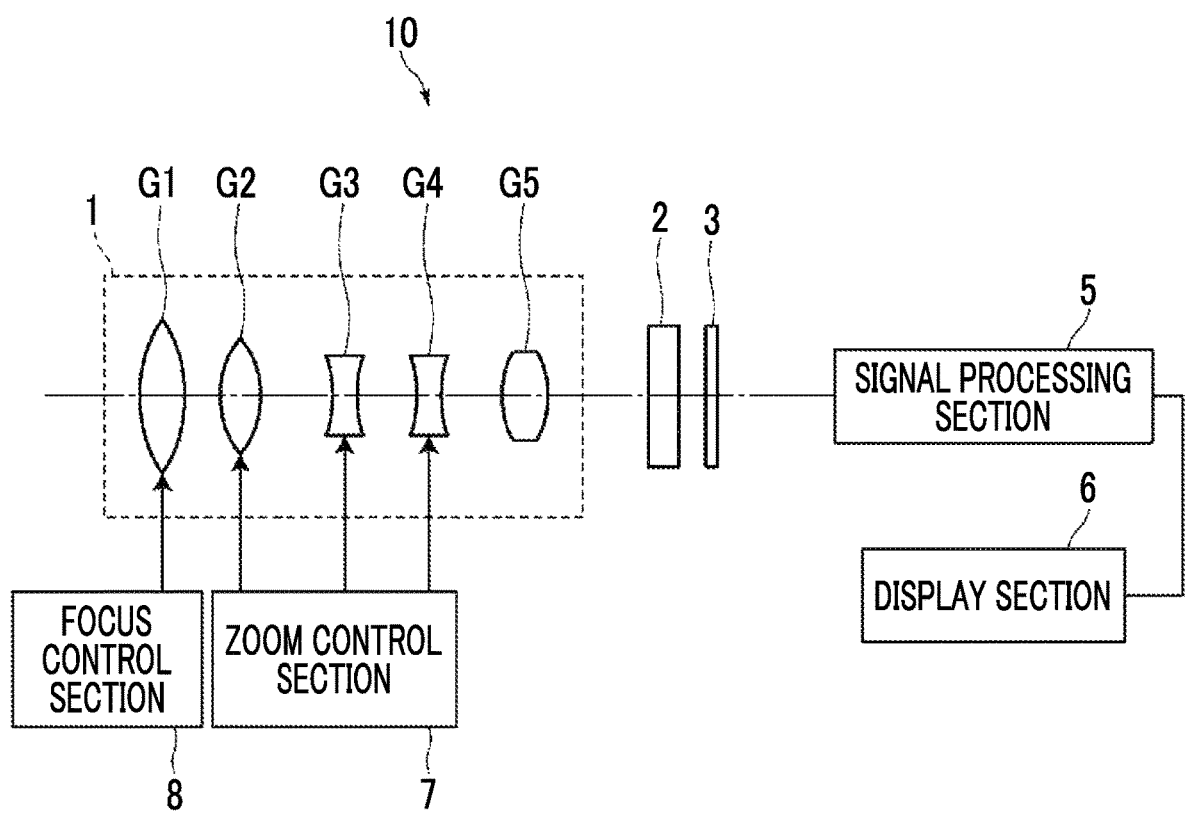
FIG. 16 is a schematic configuration diagram of an imaging apparatus according to an embodiment of the present invention.

Next, an imaging apparatus according to an embodiment of the present invention will be described. FIG. 16 is a schematic configuration diagram of an imaging apparatus 10 using the zoom lens 1 according to the above-mentioned embodiment of the present invention as an example of an imaging apparatus of an embodiment of the present invention. Examples of the imaging apparatus 10 include a movie imaging camera, a broadcast camera, a movie imaging camera, a digital camera, a video camera, a surveillance camera, and the like.

The imaging apparatus 10 comprises a zoom lens 1, a filter 2 which is disposed on the image side of the zoom lens 1, and an imaging element 3 which is disposed on the image side of the filter 2. FIG. 16 schematically shows a first lens group G1, a second lens group G2, a third lens group G3, a fourth lens group G4, and a fifth lens group G5 provided in the zoom lens 1.

The imaging element 3 captures an optical image, which is formed through the zoom lens 1, and converts the image into an electrical signal. For example, charge coupled device (CCD), complementary metal oxide semiconductor (CMOS), or the like may be used. The imaging element 3 is disposed such that the imaging surface thereof is coplanar with the image plane of the zoom lens 1.

The imaging apparatus 10 also comprises a signal processing section 5 which performs calculation processing on an output signal from the imaging element 3, a display section 6 which displays an image formed by the signal processing section 5, a zoom control section 7 which controls zooming of the zoom lens 1, and a focus control section 8 which controls focusing of the zoom lens 1. It should be noted that FIG. 16 shows only one imaging element 3, but the imaging apparatus of the present invention is not limited to this, and may be a so-called three-plate imaging apparatus having three imaging elements.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

What is claimed is:

1. A zoom lens consisting of, in order from an object side to an image side:
    a first lens group that has a positive refractive power;
    a second lens group that has a positive refractive power;
    a third lens group that has a negative refractive power;
    a fourth lens group that has a negative refractive power; and
    a fifth lens group that has a positive refractive power,
    wherein during zooming from the wide-angle end to the telephoto end, the first lens group and the fifth lens group remain stationary with respect to an image plane, the second lens group moves toward the image side, the third lens group and the fourth lens group move in a direction of an optical axis, and all distances between adjacent lens groups in the direction of the optical axis changes,
    wherein in a state where an object at infinity is in focus, assuming that a focal length of the first lens group is f1 and a focal length of the third lens group is f3, Conditional Expression (1) is satisfied, $$-10 < f1/f3 < -3.5 \qquad (1).$$

2. A zoom lens consisting of, in order from an object side to an image side:
    a first lens group that has a positive refractive power;
    a second lens group that has a positive refractive power;
    a third lens group that has a negative refractive power;
    a fourth lens group that has a negative refractive power; and
    a fifth lens group that has a positive refractive power,
    wherein during zooming from the wide-angle end to the telephoto end, the first lens group and the fifth lens group remain stationary with respect to an image plane, the second lens group moves toward the image side, the third lens group and the fourth lens group move in a direction of an optical axis, and all distances between adjacent lens groups in the direction of the optical axis changes,
    wherein a lens closest to the image side in the first lens group is a positive lens, and
    wherein assuming that a refractive index of the lens closest to the image side in the first lens group at the d line is N1p, an Abbe number of the lens at the d line is ν1p, and a partial dispersion ratio of the lens between a g line and an F line is θgF1p, all Conditional Expressions (2), (3), and (4) are satisfied, $$1.7 < N1p < 1.9 \qquad (2)$$

$$45 < \nu 1p < 58 \qquad (3)$$

$$0.63 < \theta gF1p + 0.001625 \times \nu 1p < 0.65 \qquad (4).$$

3. The zoom lens according to claim 1, wherein in a state where an object at infinity is in focus, assuming that a focal length of the first lens group is f1 and a focal length of the second lens group is f2, Conditional Expression (5) is satisfied, $$0.2 < f1/f2 < 1 \quad (5).$$

4. The zoom lens according to claim 1, wherein the second lens group consists of a positive lens convex toward the object side.

5. The zoom lens according to claim 1,
wherein first and second lenses from the object side in the third lens group are negative lenses, and
wherein assuming that a composite focal length of the first and second lenses from the object side in the third lens group is f3a and a focal length of the third lens group is f3, Conditional Expression (6) is satisfied, $$0.3 < f3a/f3 < 0.7 \quad (6).$$

6. The zoom lens according to claim 1, wherein the first lens group consists of, in order from the object side to the image side, a first-a sub-lens group that has a negative refractive power and remains stationary with respect to the image plane during focusing, a first-b sub-lens group that has a positive refractive power and moves in the direction of the optical axis during focusing, and a first-c sub-lens group that has a positive refractive power and moves in the direction of the optical axis along a locus different from the first-b sub-lens group during focusing.

7. The zoom lens according to claim 6, wherein the first-a sub-lens group consists of, in order from the object side to the image side, a biconcave lens, a biconvex lens, and a biconvex lens.

8. The zoom lens according to claim 6, wherein the first-b sub-lens group consists of, in order from the object side to the image side, a positive lens convex toward the object side and a biconvex lens.

9. The zoom lens according to claim 6, wherein the first-c sub-lens group consists of a positive meniscus lens convex toward the object side.

10. The zoom lens according to claim 1,
wherein a second lens from the image side in the first lens group is a positive lens, and
wherein assuming that a refractive index of the second lens from the image side in the first lens group at the d line is N2p and an Abbe number of the second lens at the d line is ν2p, and a partial dispersion ratio of the second lens between the g line and the F line is θgF2p, all Conditional Expressions (7), (8), and (9) are satisfied, $$1.48 < N2p < 1.6 \quad (7)$$

$$67 < \nu2p < 83 \quad (8)$$

$$0.65 < \theta gF2p + 0.001625 \times \nu2p < 0.68 \quad (9).$$

11. The zoom lens according to claim 1, wherein Conditional Expression (1-1) is satisfied, $$-8 < f1/f3 < -3.7 \quad (1-1).$$

12. The zoom lens according to claim 1, wherein Conditional Expression (1-2) is satisfied, $$-6 < f1/f3 < -3.9 \quad (1-2).$$

13. The zoom lens according to claim 2, wherein Conditional Expression (2-1) is satisfied, $$1.7 < N1p < 1.85 \quad (2-1).$$

14. The zoom lens according to claim 2, wherein Conditional Expression (3-1) is satisfied, $$46 < \nu1p < 56 \quad (3-1).$$

15. The zoom lens according to claim 2, wherein Conditional Expression (4-1) is satisfied, $$0.63 < \theta gF1p + 0.001625 \times \nu1p < 0.645 \quad (4-1).$$

16. The zoom lens according to claim 2, wherein Conditional Expression (4-2) is satisfied, $$0.635 < \theta gF1p + 0.001625 \times \nu1p < 0.645 \quad (4-2).$$

17. The zoom lens according to claim 3, wherein Conditional Expression (5-1) is satisfied, $$0.4 < f1/f2 < 0.9 \quad (5-1).$$

18. The zoom lens according to claim 5, wherein Conditional Expression (6-1) is satisfied, $$0.4 < f3a/f3 < 0.7 \quad (6-1).$$

19. The zoom lens according to claim 10, wherein Conditional Expression (9-1) is satisfied, $$0.655 < \theta gF2p + 0.001625 \times \nu2p < 0.675 \quad (9-1).$$

20. An imaging apparatus comprising the zoom lens according to claim 1.

* * * * *